US012629312B2

(12) United States Patent
Dellimore et al.

(10) Patent No.: US 12,629,312 B2
(45) Date of Patent: May 19, 2026

(54) WEARABLE DEVICE AND A METHOD OF USING A WEARABLE DEVICE

(71) Applicant: KONINKLIJKE PHILIPS N.V., Eindhoven (NL)

(72) Inventors: Kiran Hamilton J. Dellimore, Utrecht (NL); Harold Johannes Antonius Brans, Berkel-Enschot (NL); Albertus Cornelis Den Brinker, Eindhoven (NL); Okke Ouweltjes, Veldhoven (NL); Pascal De Graaf, Eindhoven (NL); Marco Baragona, Delft (NL); Samer Bou Jawde, Cambridge, MA (US)

(73) Assignee: Koninklijke Philips N.V., Eindhoven (NL)

( * ) Notice: Subject to any disclaimer, the term of this patent is extended or adjusted under 35 U.S.C. 154(b) by 1056 days.

(21) Appl. No.: 17/399,393

(22) Filed: Aug. 11, 2021

(65) Prior Publication Data

US 2022/0087895 A1 Mar. 24, 2022

Related U.S. Application Data

(60) Provisional application No. 63/080,328, filed on Sep. 18, 2020.

(51) Int. Cl.
*A61H 9/00* (2006.01)
*A61H 31/00* (2006.01)

(52) U.S. Cl.
CPC ........... *A61H 9/0078* (2013.01); *A61H 31/00* (2013.01); *A61H 2201/1207* (2013.01);
(Continued)

(58) Field of Classification Search
CPC .................. A61H 9/0078; A61H 31/00; A61H 2201/1207; A61H 2201/165;
(Continued)

(56) References Cited

U.S. PATENT DOCUMENTS 5,078,134 A 1/1992 Bowling
5,453,081 A * 9/1995 Hansen ................ A61H 9/0078 601/149
(Continued)

FOREIGN PATENT DOCUMENTS

EP 3291240 A1 * 3/2018 ........... A61H 23/006
EP 3378462 A1 * 9/2018 ......... A61H 23/0263
(Continued)

OTHER PUBLICATIONS

Machine translation of written description and claims of WO2019093073A1 via espacenet (Year: 2019).*
(Continued)

*Primary Examiner* — Brandy S Lee
*Assistant Examiner* — Tyler A Raubenstraw
(74) *Attorney, Agent, or Firm* — Daniel H. Brean

(57) ABSTRACT

According to an aspect, there is provided a wearable device, the wearable device comprising: an inflatable body configured to be mounted to a torso of a user; a first sensing device, wherein the first sensing device comprises a first sensor and a first actuator coupling the first sensor to the inflatable body; and a memory storing computer-readable instructions that, when executed, cause the wearable device to: inflate the inflatable body from a first state of the inflatable body to a second state of the inflatable body; actuate the first actuator from a first state of the first actuator to a second state of the first actuator, wherein actuating the first actuator from the first state of the first actuator to the second state of the first actuator reduces a volume of a first air gap between the torso
(Continued)

and the first sensor; and while the inflatable body is in the second state of the inflatable body and the first actuator is in the second state of the first actuator receive a first signal from the first sensor. There is also described a method of using the wearable device.

14 Claims, 18 Drawing Sheets

(52) U.S. Cl.
CPC .................. *A61H 2201/165* (2013.01); *A61H 2201/5058* (2013.01); *A61H 2205/08* (2013.01); *A61H 2230/405* (2013.01)

(58) Field of Classification Search
CPC ........ A61H 2201/5058; A61H 2205/08; A61H 2230/405; A61H 9/00
See application file for complete search history.

(56) References Cited

U.S. PATENT DOCUMENTS

| | | | | | |
|---|---|---|---|---|---|
| 5,569,170 | A * | 10/1996 | Hansen | A61H 9/0078 601/149 |
| 5,938,627 | A * | 8/1999 | Hickman | A61H 9/0078 601/149 |
| 6,224,538 | B1 * | 5/2001 | Wang | A61H 9/0078 600/19 |
| 10,524,975 | B2 * | 1/2020 | Clapp | A61H 9/0078 |
| 11,432,991 | B2 * | 9/2022 | Lee | A61B 7/003 |
| 2004/0158177 | A1 * | 8/2004 | Van Brunt | A61H 9/0078 601/44 |
| 2005/0126578 | A1 * | 6/2005 | Garrison | A61H 9/0078 128/874 |
| 2005/0235988 | A1 * | 10/2005 | Hansen | F04B 35/06 128/200.24 |
| 2007/0004992 | A1 * | 1/2007 | Van Brunt | A61H 9/0078 601/44 |
| 2007/0239087 | A1 * | 10/2007 | Kivisto | A61H 31/00 601/44 |
| 2008/0000477 | A1 * | 1/2008 | Huster | A61M 16/00 128/204.23 |
| 2008/0222771 | A1 * | 9/2008 | Natonson | A61H 9/0078 2/102 |
| 2010/0326442 | A1 * | 12/2010 | Hamilton | A61M 16/209 601/41 |
| 2012/0016282 | A1 * | 1/2012 | Van Brunt | A61H 9/00 601/89 |
| 2014/0088468 | A1 * | 3/2014 | Murison | F04B 11/0091 601/150 |
| 2014/0100469 | A1 | 4/2014 | Sagalovich | |
| 2014/0276150 | A1 | 9/2014 | Sun | |
| 2014/0276271 | A1 * | 9/2014 | Stryker | A61H 23/04 601/107 |
| 2015/0157532 | A1 * | 6/2015 | Smith | A61H 23/0263 601/46 |
| 2015/0202115 | A1 * | 7/2015 | Aronson | A61H 9/0078 601/11 |
| 2016/0151232 | A1 * | 6/2016 | Clapp | A61H 9/0078 601/148 |
| 2016/0158098 | A1 * | 6/2016 | Paradis | A61H 9/0078 600/41 |
| 2016/0166463 | A1 * | 6/2016 | Douglas | A61F 5/012 601/150 |
| 2017/0027813 | A1 * | 2/2017 | Bobey | A61H 9/0078 |
| 2017/0095395 | A1 * | 4/2017 | Wennen | A61F 13/14 |
| 2017/0281460 | A1 * | 10/2017 | Zgoda | A61H 31/004 |
| 2018/0177483 | A1 * | 6/2018 | Ye | A61H 23/004 |
| 2018/0272147 | A1 * | 9/2018 | Freeman | G16H 50/30 |
| 2018/0338721 | A1 | 11/2018 | Wang | |
| 2019/0099152 | A1 | 4/2019 | Dewar | |
| 2019/0142686 | A1 | 5/2019 | Lee | |
| 2019/0224434 | A1 * | 7/2019 | Silver | A61N 1/3904 |
| 2020/0060926 | A1 * | 2/2020 | Douglas | A61F 5/012 |
| 2020/0100981 | A1 * | 4/2020 | Bobey | A61H 23/0263 |
| 2020/0170610 | A1 | 6/2020 | Al-Ali | |
| 2020/0237607 | A1 * | 7/2020 | Ramanan | A61H 9/0092 |
| 2020/0268600 | A1 * | 8/2020 | Paradis | A61H 31/006 |
| 2020/0316365 | A1 * | 10/2020 | Hyde | A63B 22/0076 |
| 2021/0059900 | A1 * | 3/2021 | Halperin | A61H 31/006 |
| 2021/0137779 | A1 * | 5/2021 | Ayu | A61H 9/0007 |

FOREIGN PATENT DOCUMENTS

| | | | | | |
|---|---|---|---|---|---|
| EP | 3782597 | A1 * | 2/2021 | A61H 23/04 |
| WO | WO-2011153622 | A1 * | 12/2011 | A61B 5/08 |
| WO | WO-2015100494 | A1 * | 7/2015 | C07C 67/03 |
| WO | WO-2019093073 | A1 * | 5/2019 | A61H 31/00 |
| WO | WO-2019229160 | A1 * | 12/2019 | A61H 9/0078 |
| WO | 2020018707 | A1 | 1/2020 | |
| WO | WO-2020097674 | A1 * | 5/2020 | A61H 9/0021 |
| WO | WO-2021113663 | A1 * | 6/2021 | A61H 23/0245 |

OTHER PUBLICATIONS

Hill, D.B. et al. "A Biophysical Basis for Mucus Solids Concentration as a Candidate Biomarker for Airways Disease." PLOS ONE 9, No. 2 (Feb. 18, 2014): e87681. https://doi.org/10.1371/journal.pone.0087681.

Serisier, D.J. et al., "Macrorheology of cystic fibrosis, chronic obstructive pulmonary disease & normal sputum." Respiratory Research vol. 10, Article No. 63, 2009.

Demitri, C. et al. "Hydrogel Based Tissue Mimicking Phantom for In-VitroUltrasound Contrast Agents." J Biomed Mater Res Part B: Appl Biomater 87B;2008:338-345. https://www.ncbi.nlm.nih.gov/pmc/articles/PMC5126009/.

Cafarelli, A. et al. "Speed of sound in rubber-based materials for ultrasonic phantoms." J Ultrasound (2016)19;2016:251-256. https://www.ncbi.nlm.nih.gov/pubmed/18536040.

https://radiopaedia.org/articles/acoustic-impedance, dated Jan. 22, 2023.

Maria, A.R. et al. "3D shape recognition software used for classification of the human bodies." 5th International Conference on Virtual Learning ICVL 2010.

Pasterkamp, H. et al. "Respiratory Sounds: Advances Beyond the Stethoscope." American Journal of Respiratory and Critical Care Medicine 156, No. 3 (Sep. 1997): 974-87. https://doi.org/10.1164/ajrccm.156.3.9701115.

Pramono, R. et al. "Automatic Adventitious Respiratory Sound Analysis: A Systematic Review." PLOS ONE 12, No. 5 (May 26, 2017): e0177926. https://doi.org/10.1371/journal.pone.0177926.

International Search Report for PCT/EP2021/074176 filed Sep. 1, 2021.

* cited by examiner

WEARABLE DEVICE AND A METHOD OF USING A WEARABLE DEVICE

CROSS-REFERENCE TO RELATED APPLICATIONS

This patent application claims the priority benefit under 35 U.S.C. § 119(e) of U.S. Provisional Application No. 63/080,328, filed on Sep. 18, 2020, the contents of which are herein incorporated by reference.

FIELD OF THE INVENTION

The invention relates to a wearable device and a method of using a wearable device.

BACKGROUND OF THE INVENTION

Many patients with chronic respiratory diseases, such as chronic obstructive pulmonary disease (COPD) and cystic fibrosis (CF), experience severe mucus build-up in their lungs. They must periodically clear the mucus, which is often difficult to expel. Various methods are typically employed to first loosen and/or thin the mucus prior to expulsion by coughing. Loosening and/or thinning of the mucus is usually achieved by manual means (e.g. chest percussion) or semi-automated means (e.g. high frequency chest wall oscillation therapy or HFCWO). In the latter case, HFCWO device settings are currently not optimized to meet patient-specific mucus removal needs. For example, CF patients typically have very thick, viscous mucus, while COPD patients have an excess amount of mucus with viscosity in between normal and CF mucus viscosities, which are both very different from normal mucus viscosities.

These different mucus build-up situations require very different vest settings, often in combination with mucolytic medication, in order to ensure effective mucus loosening and/or thinning However, commercially available HFCWO vests do not offer a means to quantify mucus properties and therefore are unable to deliver dynamic personalized therapy during a therapy session. To overcome this limitation, it has been proposed to perform lung sound analysis using microphones embedded in the HFCWO vest. It would be desirable to minimise attenuation of noise and acoustic interference during the lung sound acquisition process in order to improve signal quality. US 2019/0142686 describes a wearable device configured to oscillate a chest of a user. The wearable device includes a chest wall oscillator, a sound detector and a controller for controlling operations of the chest wall oscillator based on sound from the sound detector. The chest wall oscillator may be mounted on the chest of the user to oscillate the chest of the user. The sound detector detects the sound from the chest of the user before, during and/or after operation of the chest wall oscillator. The controller may change one or more of a frequency, intensity or duration of the oscillations of the chest wall oscillator, depending on an analysis of the sound from the sound detector.

SUMMARY OF THE INVENTION

According to a first specific aspect, there is provided a wearable device, the wearable device comprising: an inflatable body configured to be mounted to a torso of a user; a first sensing device, wherein the first sensing device comprises a first sensor and a first actuator coupling the first sensor to the inflatable body; and a memory storing computer-readable instructions that, when executed, cause the wearable device to: inflate the inflatable body from a first state of the inflatable body to a second state of the inflatable body; actuate the first actuator from a first state of the first actuator to a second state of the first actuator, wherein actuating the first actuator from the first state of the first actuator to the second state of the first actuator reduces a volume of a first air gap between the torso and the first sensor; and while the inflatable body is in the second state of the inflatable body and the first actuator is in the second state of the first actuator, receive a first signal from the first sensor and.

The provision of a wearable device in accordance with the first specific aspect improves the quality of the first signal by allowing the first sensor to be brought into closer proximity with the torso prior to actuation of the first actuator and provides a preliminary amount of air gap reduction that is effective regardless of torso shape.

The wearable device may further comprise a second sensing device. The second sensing device may comprise a second sensor and a second actuator coupling the second sensor to the inflatable body. The computer-readable instructions, when executed, may further cause the wearable device to actuate the second actuator from a first state of the second actuator to a second state of the second actuator and receive a second signal from the second sensor. Actuating the second actuator from the first state of the second actuator to the second state of the second actuator may reduce a volume of a second air gap between the torso and the second sensor. The second signal may be received from the second sensor while the inflatable body is in the second state of the inflatable body and the second actuator is in the second state of the second actuator.

The first sensing device may comprise a first housing that houses the first sensor. The first air gap may be between the torso and the first housing. The first actuator may couple the first housing to the inflatable body and actuating the first actuator from the first state of the first actuator to the second state of the first actuator may reduce the volume of the first air gap between the torso and the first housing. The second sensing device may comprise a second housing that houses the second sensor. The second air gap may be between the torso and the second housing. The second actuator may couple the second housing to the inflatable body and actuating the second actuator from the first state of the second actuator to the second state of the second actuator may reduce the volume of the second air gap between the torso and the second housing.

The first sensor may be a first acoustic sensor. The second sensor may be a second acoustic sensor.

The first actuator may comprise a first inflatable bladder. Actuating the first actuator from the first state of the first actuator to the second state of the first actuator may comprise inflating the first inflatable bladder. The second actuator may comprise a second inflatable bladder. Actuating the second actuator from the first state of the second actuator to the second state of the second actuator may comprise inflating the second inflatable bladder.

The first actuator may comprise a first electroactive polymer. Actuating the first actuator from the first state of the first actuator to the second state of the first actuator may comprise applying a first voltage to the first electroactive polymer. The second actuator may comprise a second electroactive polymer. Actuating the second actuator from the first state of the second actuator to the second state of the second actuator may comprise applying a second voltage to the second electroactive polymer.

According to a second specific aspect, there is provided a method of using a wearable device as described in any preceding statement. The method comprises: inflating the inflatable body from the first state of the inflatable body to the second state of the inflatable body; actuating the first actuator from the first state of the first actuator to the second state of the first actuator, wherein actuating the first actuator from the first state of the first actuator to the second state of the first actuator reduces the volume of the first air gap; and while the inflatable body is in the second state of the inflatable body and the first actuator is in the second state of the first actuator, receiving a first signal from the first sensor.

The provision of a wearable device in accordance with the second specific aspect improves the quality of the first signal by bringing the first sensor into closer proximity with the torso prior to actuation of the first actuator and provides a preliminary amount of air gap reduction that is effective regardless of torso shape.

The method may further comprise actuating the second actuator from the first state of the second actuator to the second state of the second actuator and receiving a second signal from the second sensor. Actuating the second actuator from the first state of the second actuator to the second state of the second actuator may reduce a volume of a second air gap between the torso and the second sensor. The second signal may be received from the second sensor while the inflatable body is in the second state of the inflatable body and the second actuator is in the second state of the second actuator.

The method may further comprise maintaining the first actuator in the second state of the first actuator for a first period of time and receiving the first signal from the first sensor while the first actuator is maintained in the second state of the first actuator. The method may further comprise maintaining the second actuator in the second state of the second actuator for a second period of time and receiving the second signal from the second sensor while the second actuator is maintained in the second state of the second actuator.

The method may further comprise: while the inflatable body is in the second state of the inflatable body, receiving a third signal from the first sensor; determining a first value related to the volume of the first air gap based on the third signal; actuating the first actuator from the first state of the first actuator to the second state of the first actuator based on the first value. The method may further comprise receiving a fourth signal from the second sensor while the inflatable body is in the second state of the inflatable body, determining a second value related to the volume of the second air gap based on the fourth signal and actuating the second actuator from the first state of the second actuator to the second state of the second actuator based on the second value.

The first value may be a signal-to-noise ratio or a signal-to-noise ratio proxy of the third signal. The second value may be a signal-to-noise ratio or a signal-to-noise ratio proxy of the fourth signal.

The method may further comprise the first sensor emitting a first sound pulse and producing the third signal based on a reflection of the first sound pulse. The method may further comprise the second sensor emitting a second sound pulse and producing the fourth signal based on a reflection of the second sound pulse.

The torso comprises a heart. The third signal may be identified as being produced based on a sound emitted by a heartbeat of the heart. The fourth signal may be identified as being produced based on a sound emitted by a heartbeat of the heart.

The torso comprises a lung. The method may further comprise determining a period of time in which the lung is not breathing. The first value may be determined based on the third signal produced during the period of time in which the lung is not breathing. The second value may be determined based on the fourth signal produced during the period of time in which the lung is not breathing.

The method may further comprise actuating the first actuator from the first state of the first actuator to the second state of the first actuator based on a first value. The first value may be determined based on one or more predetermined characteristics of the torso. The method may further comprise actuating the second actuator from the first state of the second actuator to the second state of the second actuator based on a second value. The second value may be determined based on one or more predetermined characteristics of the torso.

These and other aspects will be apparent from and elucidated with reference to the embodiments described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
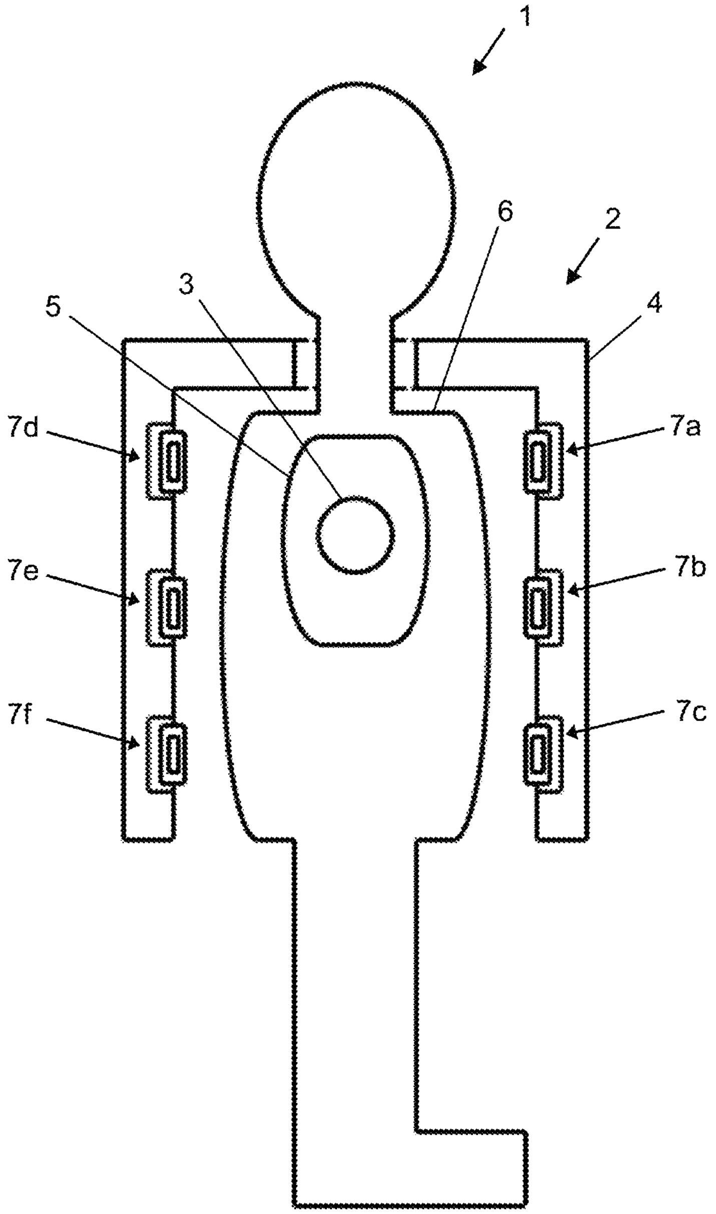
FIG. 1 is a schematic cross-sectional view of a wearable device mounted on a torso of a user.

FIG. 1 is a schematic cross-sectional view of a wearable device 2 and a user 1. The wearable device 2 comprises an inflatable body 4 which is mounted on a torso 6 of the user 1. The torso 6 comprises a heart 3 and one or more lungs 5. The surface of the torso 6 adjacent the wearable device 2 has a non-planar surface. The inflatable body 4 is in the form of a vest, such a high-frequency chest wall oscillation (HFCWO) vest. The inflatable body 4 comprises an inflatable body pump 11. The inflatable body pump 11 is an air pump used to drive chest wall oscillation during therapy. The wearable device 2 comprises a plurality of sensing devices 7*a*-7*f*. The sensing devices 7*a*-7*f* are be located on the wearable device 2 such that they are disposed at positions of interest around the torso 6 (e.g. between ribs, at tracheal positions, at vesicular positions, etc.). The wearable device 2 is shown in a first configuration in FIG. 1.

Figure 2:
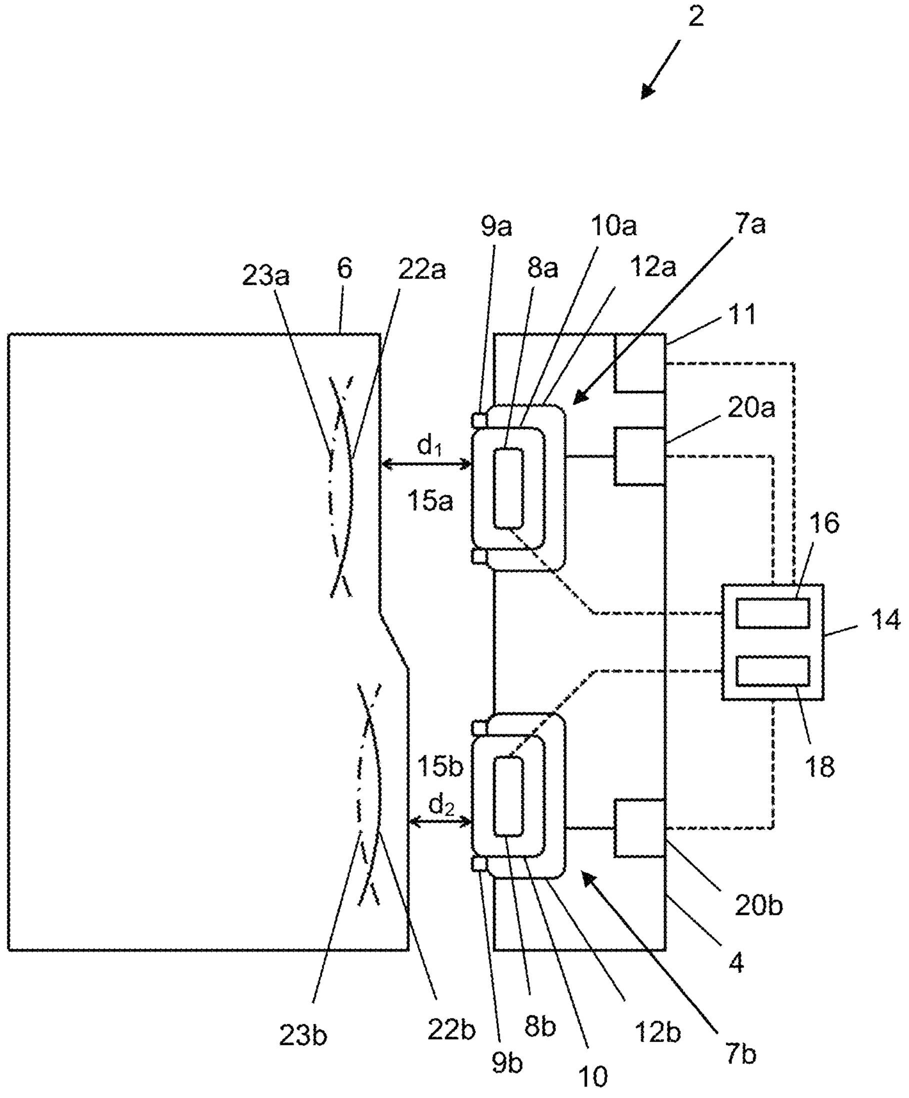
FIG. 2 is a close-up cross-sectional schematic view of the wearable device in a first configuration.

FIG. 2 is a close-up cross-sectional schematic view of the wearable device 2 in the first configuration. The inflatable body 4 is in a first, non-inflated state. FIG. 2 shows a first sensing device 7*a* and a second sensing device 7*b* of the plurality of sensing devices 7*a*-7*f*. For clarity, the structure and operation of wearable device 2 and the steps of the associated method 500 in the following description will be described with reference to only the first sensing device 7*a* and the second sensing device 7*b*. However, the remaining sensing devices 7*c*-7*f* have the same structure and interface with the remaining components of the wearable device 2 in the same manner as the first and second sensing devices 7*a*, 7*b*. In addition, the remaining sensing devices 7*c*-7*f* operate in the same manner as the first and second sensing devices 7*a*, 7*b*. There may be any number of a plurality of sensing devices (i.e. there may be more than six sensing devices).

The first sensing device 7*a* comprises a first sensor 8*a*, a first housing 10*a* housing the first sensor 8*a*, a first ring of soundproof material 9*a* and a first actuator 12*a*. The first actuator 12*a* couples the first housing 10*a* to the inflatable body 4, and, thus, couples the first sensor 8*a* to the inflatable body 4. The first sensor 8*a* is an acoustic air-coupled sensor in the form of a microphone. The first sensor 8*a* is configured to produce a series of signals including a first signal and a third signal The first ring of soundproof material 9*a* surrounds the first sensor 8*a* and the first housing 10*a*. The first actuator 12*a* comprises a first inflatable bladder. In FIG. 2, the first actuator 12*a* is in a first state, in which the first inflatable bladder is uninflated. A first air gap 15*a* is disposed between the torso 6 and the first housing 10*a*, and, thus, between the torso 6 and the first sensor 8*a*. The first housing 10*a* is separated from the torso 6 by a first distance $d_1$.

The second sensing device 7*b* comprises a second sensor 8*b*, a second ring of soundproof material 9*a*, a second housing 10*b* housing the second sensor 8*b* and a second actuator 12*b*. The second actuator 12*b* couples the second housing 10*b* to the inflatable body 4, and, thus couples the second sensor 8*b* to the inflatable body 4. The second sensor 8*b* is an acoustic air-coupled sensor in the form of a microphone. The second sensor 8*b* is configured to produce a series of signals including a second signal and a fourth signal. The second ring of soundproof material 9b surrounds the second sensor 8*b* and the second housing 10*b*. The second actuator 12*b* comprises a second inflatable bladder. In FIG. 2, the second actuator 12*b* is in a first state, in which the second inflatable bladder is uninflated. A second air gap 15*b* is disposed between the torso 6 and the second housing 10*b*, and, thus, between the torso 6 and the second sensor 8*b*. The second housing 10*b* is separated from the torso 6 by a second distance $d_2$.

The first and second housings 10*a*, 10*b* comprise a hydrogel. The hydrogel may be a light-weight hydrogel material. The light-weight hydrogel material may be a cellulose-based hydrogel having a specific acoustic impedance, Z, of between 1.50 and 1.60, a photo-crosslinked poly(ethylene glycol) diacrylate [PEGDA]-based hydrogel having a specific acoustic impedance Z of between 1.53 and 1.66 or silicone rubber (e.g. pure polyurethane rubber having a specific acoustic impedance Z of approximately 1.42. The specific acoustic impedance Z of an adult human chest wall is approximately 1.4 to $1.6\times10^6$ kg/(m$^2$s) based on an average of the acoustic impedance of fat and muscle tissue, which are the two main components of the chest wall.

The first and second air gaps 15*a*, 15*b* are formed directly between the torso 6 and the first and second housings 10*a*, 10*b* if no other garment (i.e. shirt) is being worn beneath the wearable device 2. If a garment is being worn beneath the wearable device 2, the first and second air gaps 15*a*, 15*b* may be formed between the garment and the first and second housings 10*a*, 10*b* and/or between the garment and the torso 6.

The wearable device 2 comprises a controller 14. The controller 14 comprises a processor 16 or central processing unit (CPU) and memory 18. The controller 14 is connected to the first and second sensors 8*a*, 8*b*. The controller 14 is further connected to a first pump 20*a*, a second pump 20*b* and the inflatable body pump 11. The first pump 20*a* is fluidically connected to the first inflatable bladder 12*a*. The second pump 20*b* is fluidically connected to the second inflatable bladder 12*b*. The memory 18 stores computer-readable instructions that, when executed, cause the device to carry out a method 500.

Soundwaves such as a first soundwave 22*a* and a second soundwave 22*b* are generated by the torso 6 and propagate through the torso 6. In the case of measuring lung acoustics related to mucus build-up, the source of the first and second soundwaves 22*a*, 22*b* may be lung sounds such as wheezes, crackles and rhonchi which are produced by the lung 5 during inhalation and exhalation by patients with mucus build-up. This sound energy travels from the lung 5 and through the muscle and fat tissue in the chest wall after encountering the interface between the lung 5 and the chest wall, where it is partly reflected.

The specific acoustic impedance Z (characteristic impedance) through a medium is defined by the following equation, in which p represents the density of the medium and c represents the speed of sound in the medium:

$$Z=\rho c$$

Impedance mismatch between two adjacent media occurs when the specific acoustic impedance of the two media are different. The greater the difference between the specific acoustic impedances, the higher the level of impedance mismatch.

The amount of sound energy that is reflected in the perpendicular direction from a source as it passes from a first medium with acoustic impedance $Z_1$ to a second medium with acoustic impedance $Z_2$ is referred to as the reflection fraction (RF) or intensity reflection coefficient. The RF between a first medium and a second medium is defined by the following equation, in which $Z_1$ represents the specific acoustic impedance of the first medium and $Z_2$ represents the specific acoustic impedance of the second medium:

$$RF = \frac{(Z_2 - Z_1)^2}{(Z_1 + Z_2)^2}$$

There is a relatively large impedance mismatch between the torso 6 and the first and second air gaps 15*a*, 15*b*. Accordingly, a relatively high proportion of the energy transmitted by the first and second soundwaves 22a, 22*b* is reflected back into the torso 6 at the interface between the torso 6 and the first and second air gaps 15*a*, 15*b* as first and second reflections 23*a*, 23*b*. and only a relatively small proportion of the energy transmitted by the first and second soundwaves 22*a*, 22*b* passes out of the torso 6 and into the first and second air gaps 15*a*, 15*b*. There is also a relatively large impedance mismatch between the first and second air gaps 15*a*, 15*b* and the first and second housings 10*a*, 10*b*. Accordingly, only a relatively small proportion of the energy transmitted from the torso 6 to the first and second air gaps 15*a*, 15*b* passes from the first and second air gaps 15*a*, 15*b* into the first and second housings 10*a*, 10*b*. This results in a relatively small proportion of the acoustic energy present in the first soundwave 22*a* and second soundwave 22*b* reaching the first and second sensors 8*a*, 8*b*, and, thus, the signals generated by the first and second sensors 8*a*, 8*b* have a relatively low SNR and are of poor quality when separated from the torso 6 by a large air gap.

Figure 3:
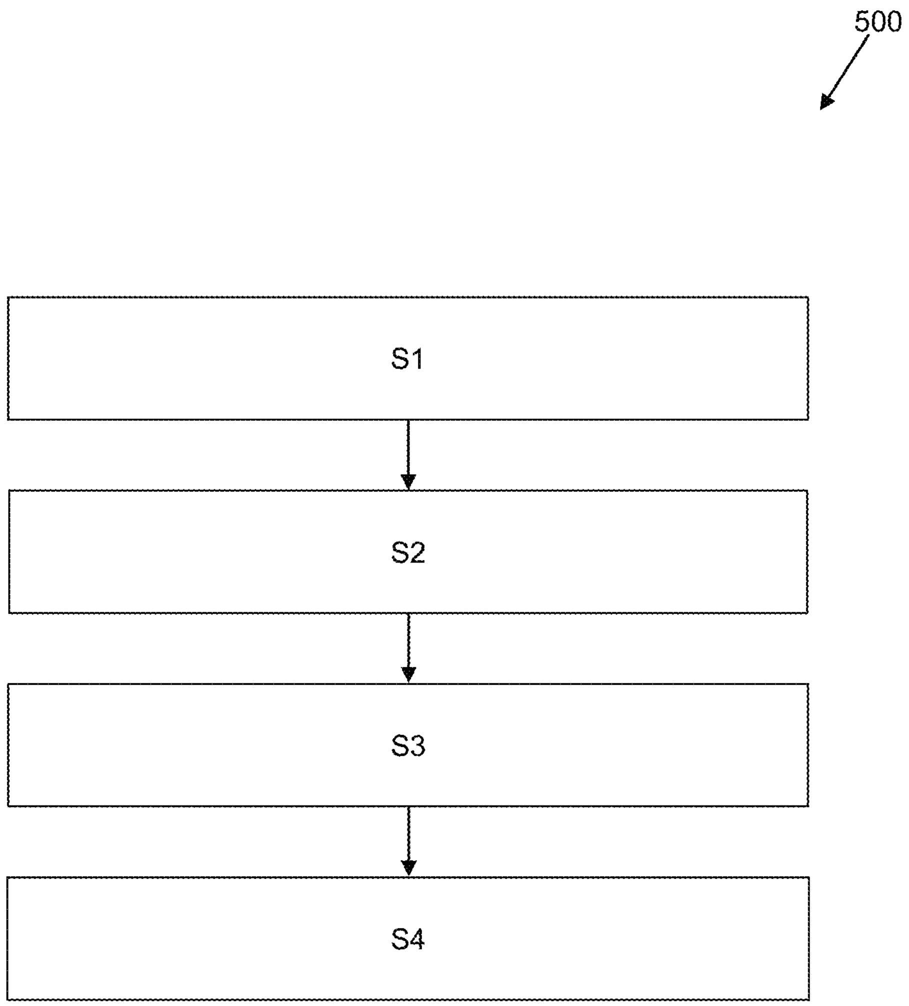
FIG. 3 shows a flow chart of a method of using the wearable device.

FIG. 3 shows a flow chart of the method 500. The method generally comprises a first step S1, a second step S2, a third step S3 and a fourth step S4. The method may be carried out during a start-up (analytical) mode of the HFCWO vest, to support quantification of mucus volume before beginning therapy.

The start-up mode may last between 30 seconds and 120 seconds, for example. The start-up mode can be used to guide and optimize therapy duration, oscillation frequency and displacement. Intermittent analytical checks may be performed during pauses in HFCWO vest therapy (e.g. mucus mobilization) to acquire acoustic measurements to quantify the progress in mucus clearance. This has the advantage of minimizing noise and disturbance of the acoustic measurements.

In the first step S1, the inflatable body 4 is inflated from the first state to a second state using the inflatable body pump 11. When in the second state, the inflatable body 4 is at a base pressure which brings it into close proximity with the torso 6 without being too tight. A pressure sensor (not shown) located within the inflatable body 4 or the inflatable body pump 11 is used to determine the pressure within the inflatable body 4, which is fed back to the controller 14 so that the controller 14 can ensure the inflatable body is inflated to the correct base pressure.

Figure 4:
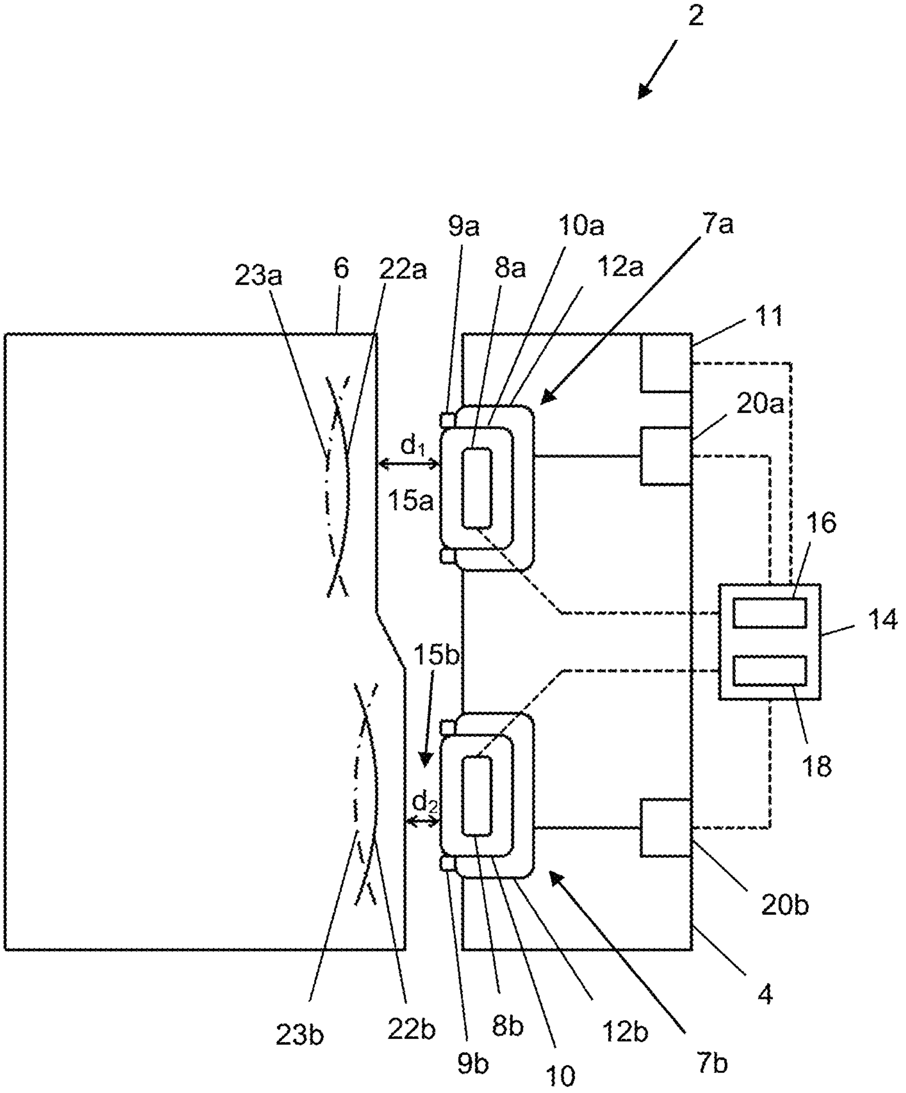
FIG. 4 is a close-up cross-sectional schematic view of the wearable device in a second configuration.

FIG. 4 is a close-up cross-sectional schematic view of the wearable device 2 in the second configuration following the first step S1. As shown, the first step S1 reduces the first distance $d_1$ and reduces the volume of the first air gap 15*a* between the torso 6 and the first housing 10*a*, and, thus, between the torso 6 and the first sensor 8*a*. The first step S1 also reduces the second distance $d_2$ and reduces the volume of the second air gap 15*b* between the torso 6 and the second housing 10*b*, and, thus, between the torso 6 and the second sensor 8*b*.

While the inflatable body 4 is in the second state, the first sensor 8*a* emits a first sound pulse and the first sensor 8*a* produces a third signal based on a reflection of the first sound pulse at the interface between the first housing 10*a* and the first air gap 15*a* or at the interface between the first housing 10*a* and the torso 6. The second sensor 8*b* emits a second sound pulse and the second sensor 8*b* produces a fourth signal based on a reflection of the second sound pulse at the interface between the second housing 10*b* and the second air gap 15*b* or at the interface between the second housing 10*b* and the torso 6.

A first value related to the volume of the first air gap 15*a* is determined based on the third signal and a second value related to the volume of the second air gap 15*b* is determined based on the fourth signal. The first value is an SNR (i.e. the ratio of signal power to noise power) of the third signal and the second value is an SNR of the fourth signal. Noise may be any undesired sounds that interfere with normal and pathologic lung sounds such as heart sounds, clothing friction and movement, motion of the user 1, speaking by the user and background sounds like music or television audio. The device 2 may determine when the lung 5 is not breathing (i.e. between breaths) based on signals outputted by the first and second sensors 8*a*, 8*b*, for example. The device 2 may ensure that that the first value is determined based on the third signal produced during the period of time in which the lung 5 is not breathing and ensure that the second value is determined based on the fourth signal produced during the period of time in which the lung 5 is not breathing.

Figure 5:
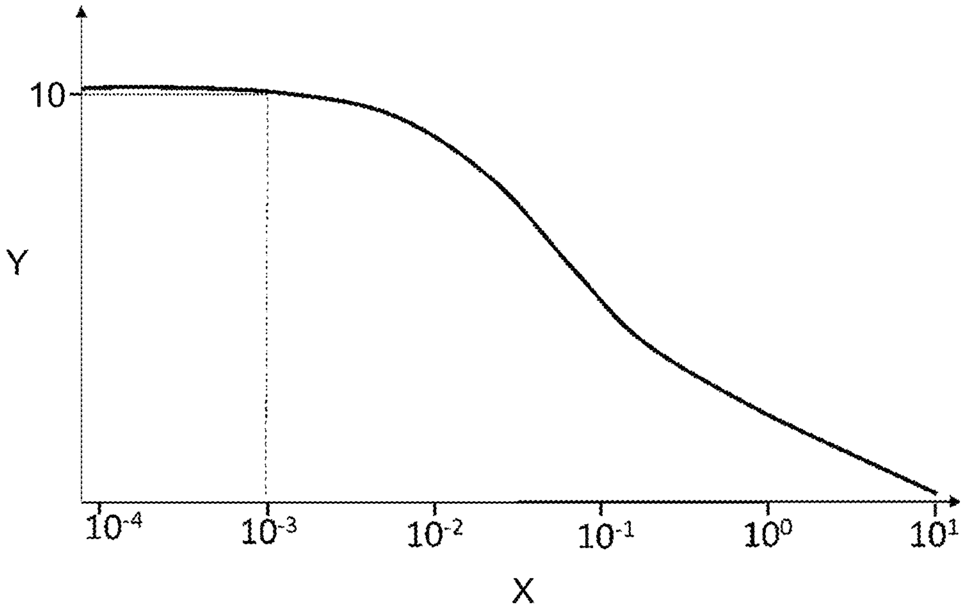
FIG. 5 is a graph showing the relationship between air gap volume and signal-to-noise ratio (SNR)

FIG. 5 is a graph showing the relationship between the volume of the first and second air gaps 15*a*, 15*b* (i.e. the air gap volume) and the SNRs of the third and fourth signals. The air gap volume in millilitres is shown on the x-axis and is denoted by the letter X. The SNR is shown on the y-axis and is denoted by the letter Y. As shown, as the air gap volume decreases, the SNR increases until it reaches a maximum. Once the maximum is reached, the air gap can be considered to be eliminated.

In the second step S2, the first actuator 12*a* is actuated from the first state to a second state. The first actuator 12*a* is actuated from the first state to the second state based on the first value. For example, the first actuator 12*a* may be actuated from the first state to the second state until the first value meets (i.e. exceeds) a threshold value (e.g. an SNR of 10, which, as shown in FIG. 5, corresponds to an acceptable air gap volume of $\mathbf{10^{-3}}$ ml). Actuating the first actuator 12*a* from the first state to the second state comprises inflating the first inflatable bladder. When in the second state, the first inflatable bladder 12a is at a pressure that is greater than the base pressure. Actuating the first actuator 12*a* from the first state to the second state reduces the volume of the first air gap 15*a* between the torso 6 and the first housing 10*a*, and, thus, between the torso 6 and the first sensor 8*a*. The first actuator 12*a* is maintained in the second state for a first period of time.

In the third step S3, the second actuator 12*b* is actuated from the first state to a second state. The second actuator 12*b* is actuated from the first state to the second state based on the second value. For example, the second actuator 12*b* may be actuated from the first state to the second state until the second value meets (i.e. exceeds) the threshold value (e.g. an SNR of 10, which, as shown in FIG. 5, corresponds to an acceptable air gap volume of $\mathbf{10^{-3}}$ ml). Actuating the second actuator 12*b* from the first state to the second state comprises inflating the second inflatable bladder. When in the first state, the second inflatable bladder 12*b* is at a pressure that is greater than the base pressure. Actuating the second actuator 12*b* from the first state to the second state reduces the volume of the second air gap 15*b* between the torso 6 and the second housing 10*b*, and, thus, between the torso 6 and the second sensor 8*b*. The second actuator 12*b* is maintained in the second state for a second period of time. The first and second periods of time are concurrent.

The second and third steps S3, S4 may be repeated multiple times (i.e. iterations) in order to reduce the air gaps to acceptably low volumes.

Figure 6:
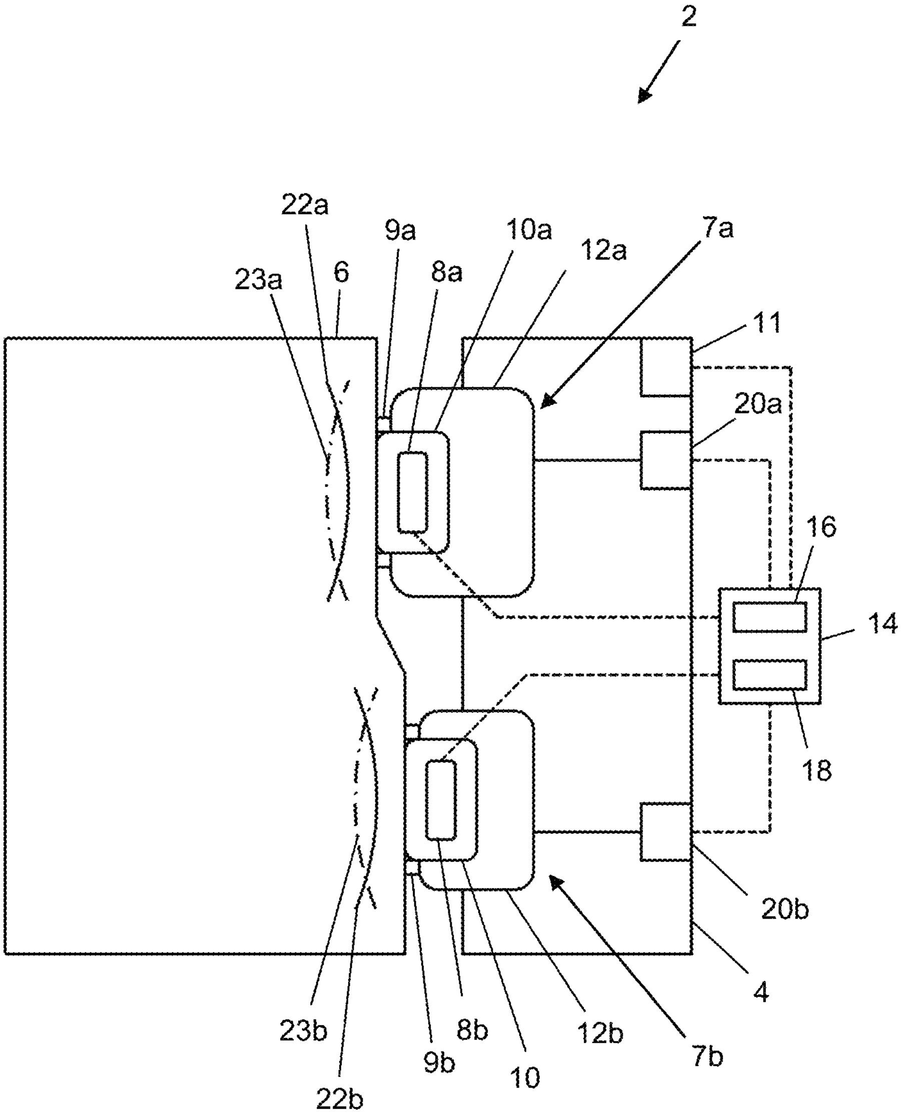
FIG. 6 is a close-up cross-sectional schematic view of the wearable device in a third configuration.

FIG. 6 is a close-up cross-sectional schematic view of the wearable device 2 in the third configuration following the second and third steps S2, S3. As shown, the second step S2 reduces the first distance d1 and the third step S3 reduces the second distance dz. The first distance $d_1$ and the second distance dz may be reduced close to zero. During the second and third steps S2, S3, the first and second actuators 12*a*, 12*b* are actuated independently of each other. Accordingly, the first and second actuators 12*a*, 12*b* may be actuated by different amounts. For example, in the third configuration shown in FIG. 6, the first actuator 12*a* is actuated by a greater extent that the second actuator 12*b*, in order to account for the non-planar surface of the body and to ensure that both actuators 12*a*, 12*b* have an acceptably low impedance mismatch.

The second and third steps S2, S3 compress the first and second housings 10*a*, 10*b* closely against the torso 6, thereby displacing air trapped between the first and second housings 10*a*, 10*b* and the torso 6. A sufficiently large amount of sound energy reaches the first and second housings 10*a*, 10*b* from the torso 6 by impedance matching at the interface between the torso 6 and the first and second housings 10*a*, 10*b*.

The second and third steps S2, S3 also result in the first and second rings of soundproof material 9*a*, 9*b* sealing against the torso 6 such that the amount of background noise reaching the first and second housings 10*a*, 10*b* and the first and second sensors 8*a*, 8*b* is reduced. In addition or alternatively, the first and second sensors 8*a*, 8*b* may be active noise cancelling microphones or be directional microphones directed toward the torso 6.

In the fourth step S4, while the inflatable body 4 is in its second state, the first actuator 12*a* is in its second state and the second actuator 12*b* is in its second state, the first sensor 8*a* produces the first signal and the second sensor 8*b* produces the second signal. The first signal is produced and received from the first sensor 8*a* while the first actuator 12*a* is maintained in the second state, and the second signal is produced and received from the second sensor 8*b* while the second actuator 12*b* is maintained in the second state. A first lung function parameter is determined based on the first signal and a second lung function parameter is determined based on the second signal. Pathological lung sounds are typically high frequency lung sounds. Accordingly, the first and second sensors 8*a*, 8*b* may be tuned to filter out low frequencies (e.g. frequencies below 1 KHz).

The method 500 ensures reliable and repeatable impedance matching to allow accurate acquisition of lung sounds for acoustic analysis of mucus build-up by improving impedance matching and attenuating noise and acoustic interference during lung sound acquisition, regardless of the shape of the user 1.

Figure 7:
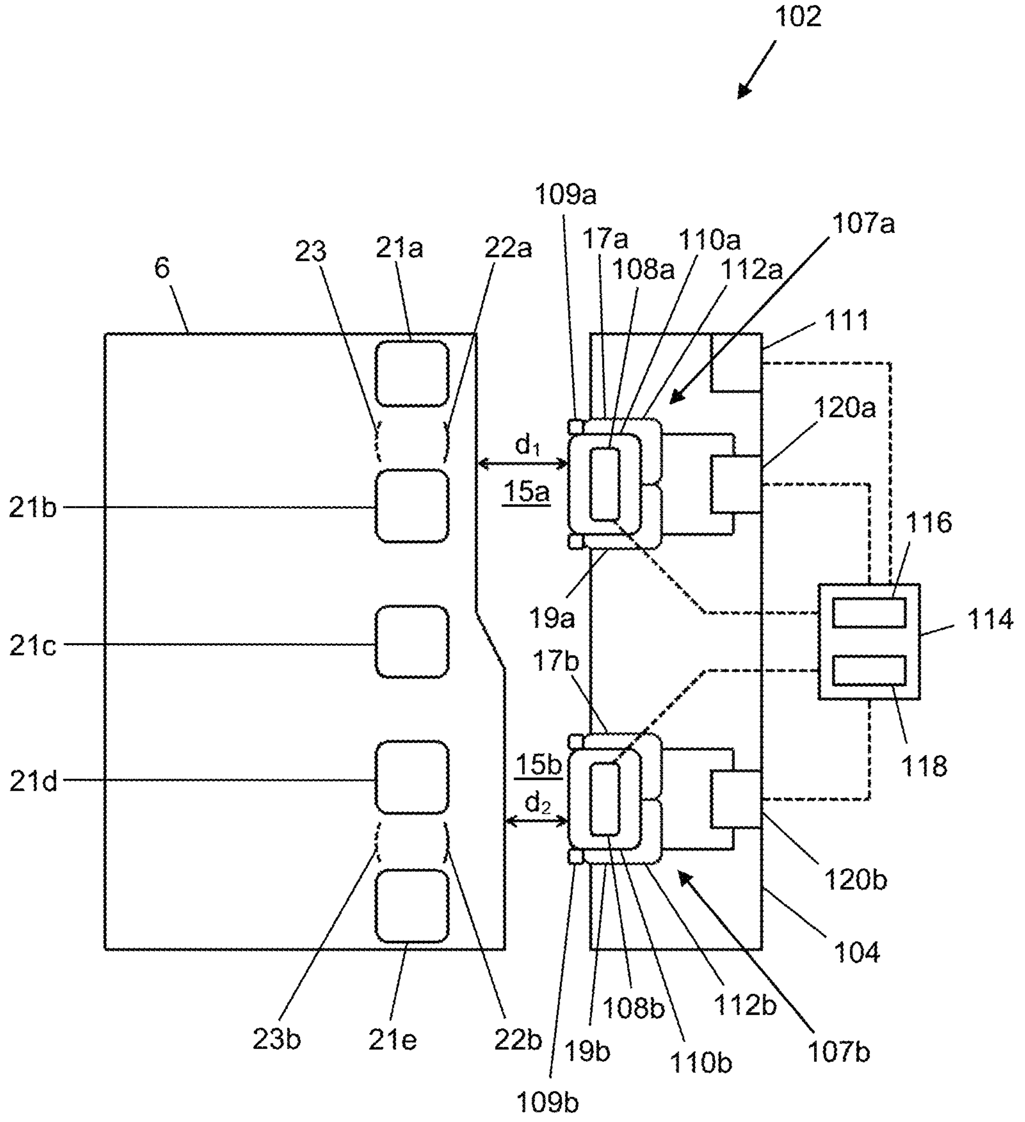
FIG. 7 is a close-up cross-sectional schematic view of a first alternative wearable device in a first configuration.

FIG. 7 is a close-up cross-sectional schematic view of a first alternative wearable device 102 in a first configuration. The structure and operation of first alternative wearable device 102 generally corresponds to the structure and operation of the wearable device 2. Corresponding features are denoted using equivalent reference numbers, with the addition of a value of 100. The first alternative wearable device 102 differs from the wearable device 2 in that the first actuator 112*a* comprises a first inflatable bladder 17*a* and a third inflatable bladder 19*a* and the second actuator 112*b* comprises a second inflatable bladder 17*b* and a fourth inflatable bladder 19*b*. As shown in FIG. 7, the torso of the user 1 comprises a first rib 21*a*, a second rib 21*b*, a third rib 21*c*, a fourth rib 21*d* and a fifth rib 21*e*.

Figure 8:
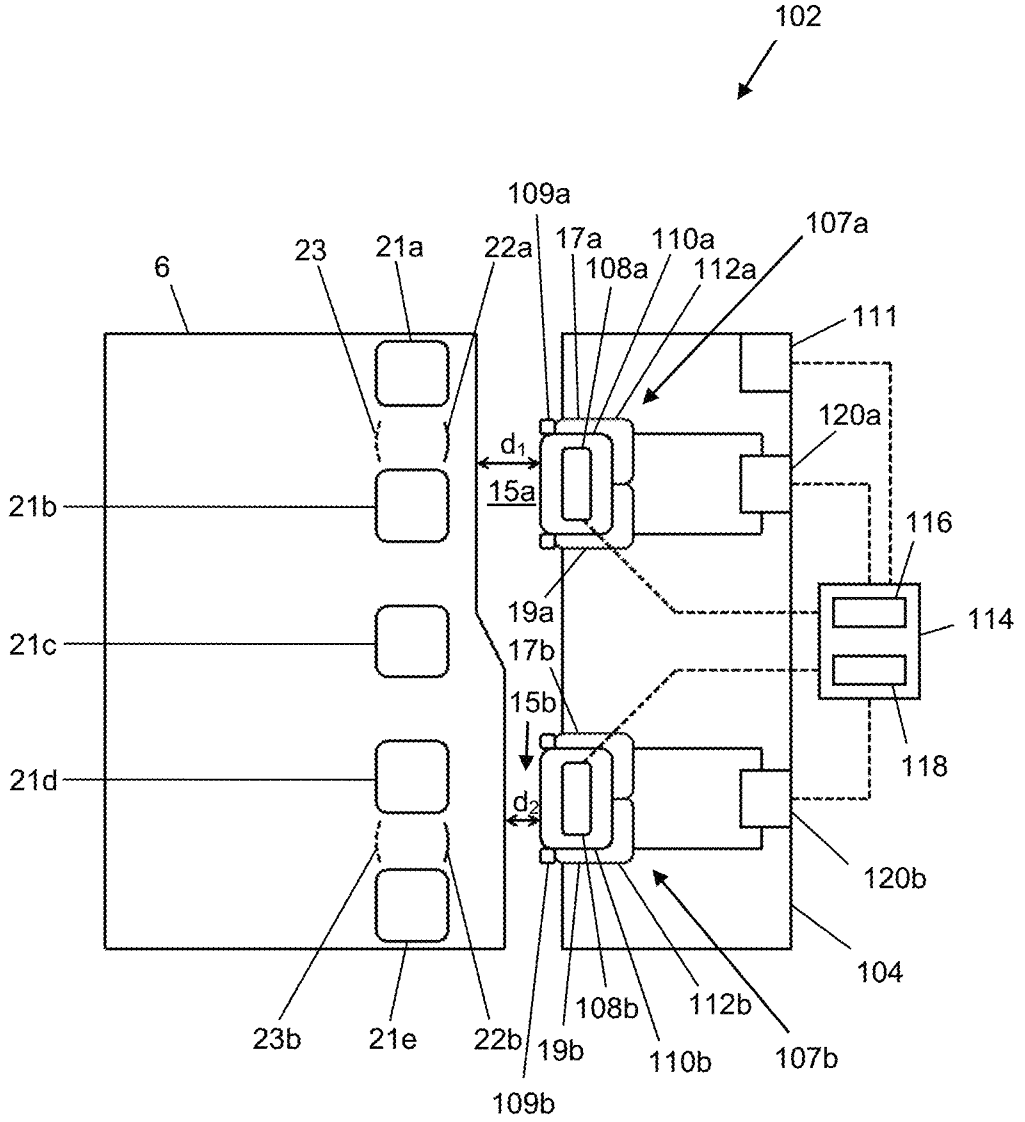
FIG. 8 is a close-up cross-sectional schematic view of the first alternative wearable device in a second configuration.

FIG. 8 is a close-up cross-sectional schematic view of the first alternative wearable device 102 in the second configuration following the first step S1. In the second configuration shown in FIG. 8, the first soundwave 122*a* is not aligned with the first sensor 108*a* and the second soundwave 122*b* is not aligned with the second sensor 108*b*. Accordingly, the SNRs of the third and fourth signals are relatively low.

In the second step S2, the first actuator 112*a* is actuated from the first state to the second state. The first actuator 112*a* is actuated from the first state to the second state based on the first value, which is an SNR of the third signal. Actuating the first actuator 112*a* from the first state to the second state comprises inflating the first inflatable bladder 17*a* and the third inflatable bladder 19*a*. The first inflatable bladder 17*a* and the third inflatable bladder 19*a* may be inflated by different amounts based on the first value. The first value may be obtained while the first housing 110*a* is in contact with the torso 6. The relative inflation of the first inflatable bladder 17*a* and the third inflatable bladder 19*a* may be varied so as to determine the SNR of the third signal for a range of relative inflations and the relative inflation of the first inflatable bladder 17*a* and the third inflatable bladder 19*a* that results in the highest (e.g. a peak) SNR of the third signal. The first inflatable bladder 17*a* and the third inflatable bladder 19*a* may then be set at the relative inflation that results in the highest SNR of the third signal.

In the third step S3, the second actuator 112*b* is actuated from the first state to the second state. The second actuator 112*b* is actuated from the first state to the second state based on the second value, which is an SNR of the fourth signal. Actuating the second actuator 112*b* from the first state to the second state comprises inflating the second inflatable bladder 17*b* and the fourth inflatable bladder 19*b*. The second inflatable bladder 17*b* and the fourth inflatable bladder 19*b* may be inflated by different amounts based on the second value. The second value may be obtained while the second housing 110*b* is in contact with the torso 6. The relative inflation of the second inflatable bladder 17*b* and the fourth inflatable bladder 19*b* may be varied so as to determine the SNR of the fourth signal for a range of relative inflations and the relative inflation of the second inflatable bladder 17*b* and the fourth inflatable bladder 19*b* that results in the highest (e.g. a peak) SNR of the fourth signal. The second inflatable bladder 17*b* and the fourth inflatable bladder 19*b* may then be set at the relative inflation that results in the highest SNR of the fourth signal.

Figure 9:
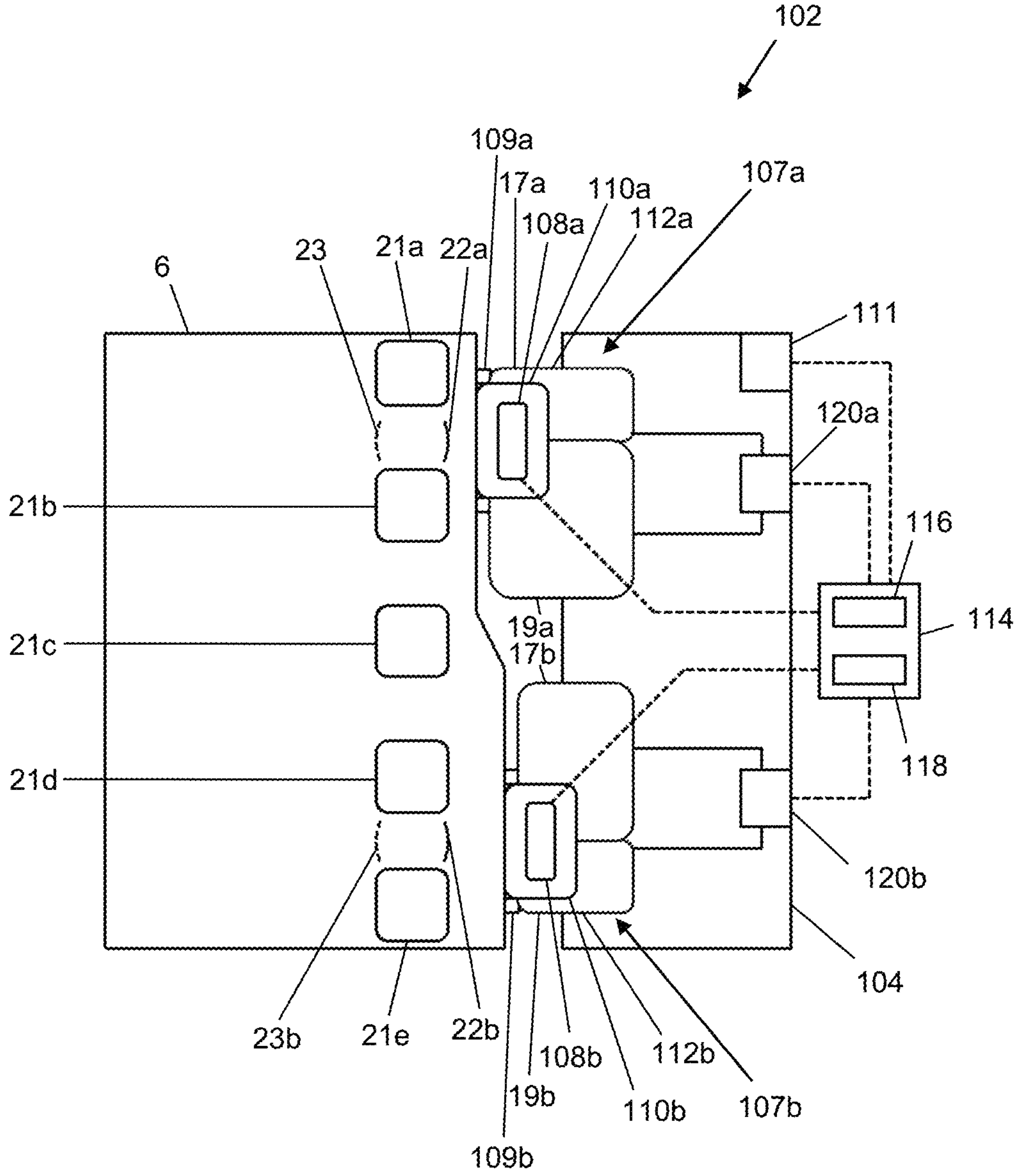
FIG. 9 is a close-up cross-sectional schematic view of the first alternative wearable device in a third configuration.

FIG. 9 is a close-up cross-sectional schematic view of the first alternative wearable device 102 in the third configuration following the second and third steps S2, S3. As shown, the second step S2 has resulted in the first sensor 108*a* being disposed between the first rib 21*a* and the second rib 21*a* such that the first sensor 108*a* is aligned with the first soundwave 122*a* and has resulted in the second sensor 108*b* being disposed between the fourth rib 21*d* and the fifth rib 21*e* such that the second sensor 108*b* is aligned with the second soundwave 122*b*.

Figure 10:
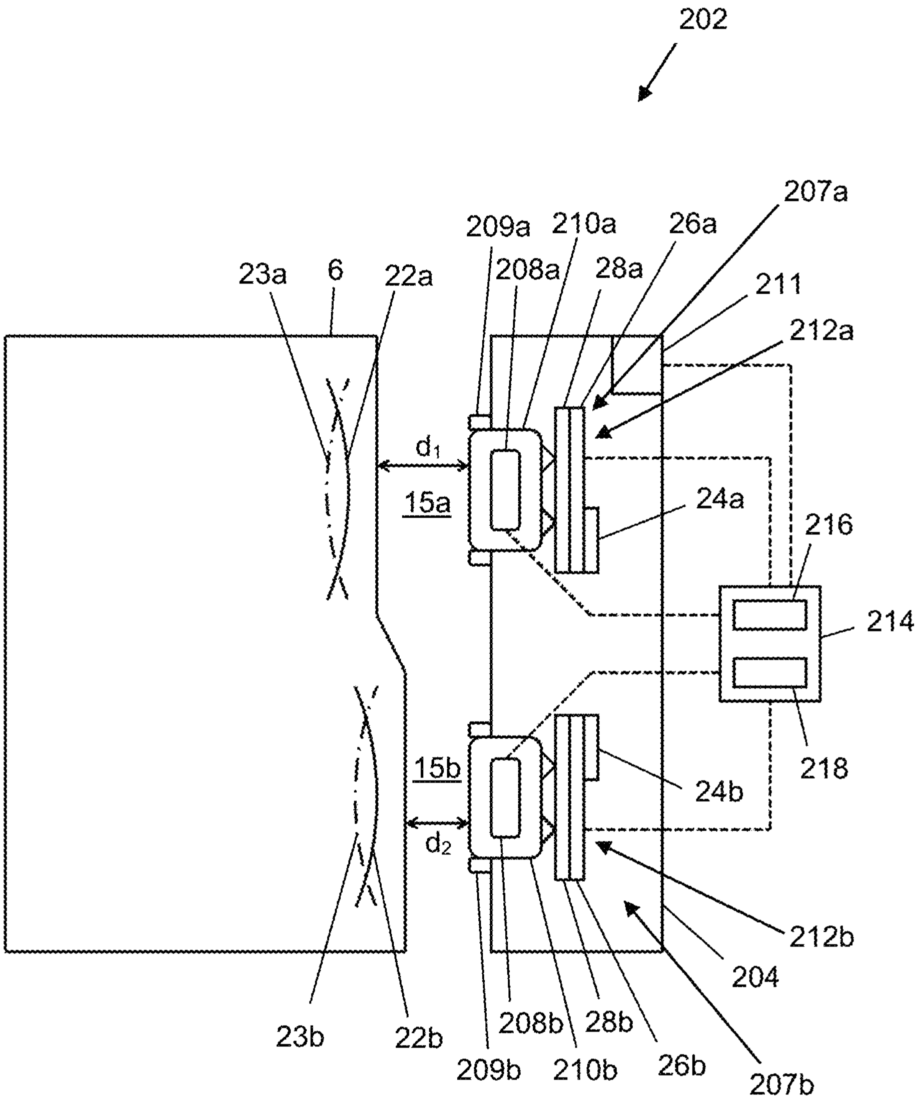
FIG. 10 is a close-up cross-sectional schematic view of a second alternative wearable device in a first configuration.

FIG. 10 is a close-up cross-sectional schematic view of a second alternative wearable device 202 in a first configuration. The structure and operation of second alternative wearable device 202 generally corresponds to the structure and operation of the wearable device 2. Corresponding features are denoted using equivalent reference numbers, with the addition of a value of 200.

The second alternative wearable device 202 differs from the wearable device 2 in that the first actuator 212*a* comprises a first voltage source 24*a*, a first electroactive polymer (EAP) 26*a* and a first pressure sensitive element 28*a*, and the second actuator 212*b* comprises a second voltage source 24*b*, a second EAP 26*b* and a second pressure sensitive element 28*b*. The first and second pressure sensitive elements 28*a*, 28*b* may be first and second pressure sensitive polyvinylidene fluoride (PVDF) foils or sheets. EAPs are lightweight and their displacement and compression force is easily controllable when coupled with a sensing element. The material used for the first and second electroactive polymers (EAP) 26*a*, 26*b* may be piezoelectric and electrostrictive polymers, dielectric elastomers, electrostrictive graft polymers, electrostrictive paper, electrets, electroviscoelastic elastomers and liquid crystal elastomers. The EAPs may be field-driven EAPs in which the polymer is sandwiched between two compliant electrodes or in which the EAP is combined with a carrier layer to form a bi-layer configuration. The EAP is stretched (in terms of molecular orientation), which forces the bending in a preferred direction. EAPs can be pre-strained for improved performance in the strained direction (pre-strain leads to better molecular alignment). The electrodes may be metal, since strains usually are in the moderate regime (1-5%). The electrodes may alternatively be formed other materials such as conducting polymers, carbon black based oils, gels, elastomers, etc. The electrodes can be continuous, or segmented.

Figure 11:
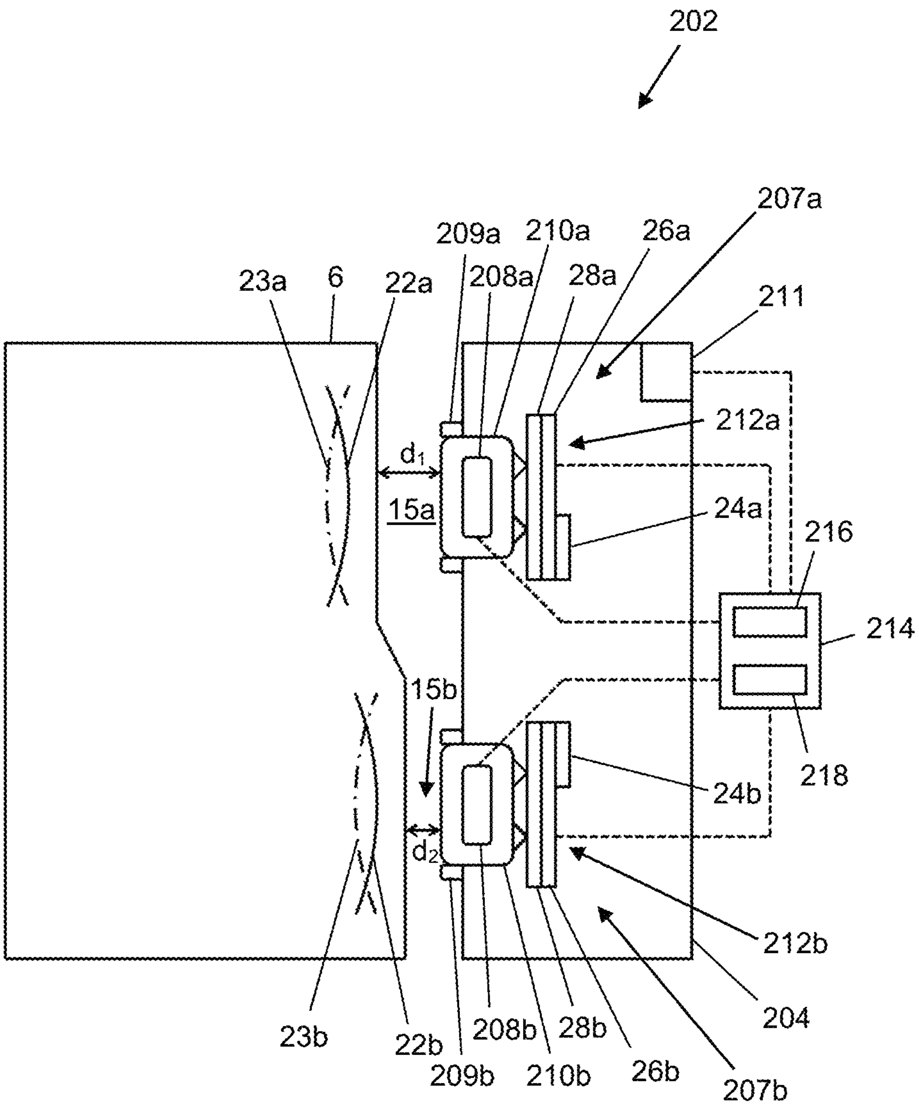
FIG. 11 is a close-up cross-sectional schematic view of the second alternative wearable device in a second configuration.

FIG. 11 is a close-up cross-sectional schematic view of the second alternative wearable device 202 in the second configuration following the first step S1.

In the second step S2, actuating the first actuator 212*a* from the first state to the second state comprises the first voltage source 24*a* applying a first voltage to the first EAP 26*a*. This causes the first EAP 26*a* to expand by a first amount. In the third step S3, actuating the second actuator 212*b* from the first state to the second state comprises the second voltage source 24*b* applying a second voltage to the second EAP 26*b*. This causes the second EAP 26*b* to expand by a second amount.

Figure 12:
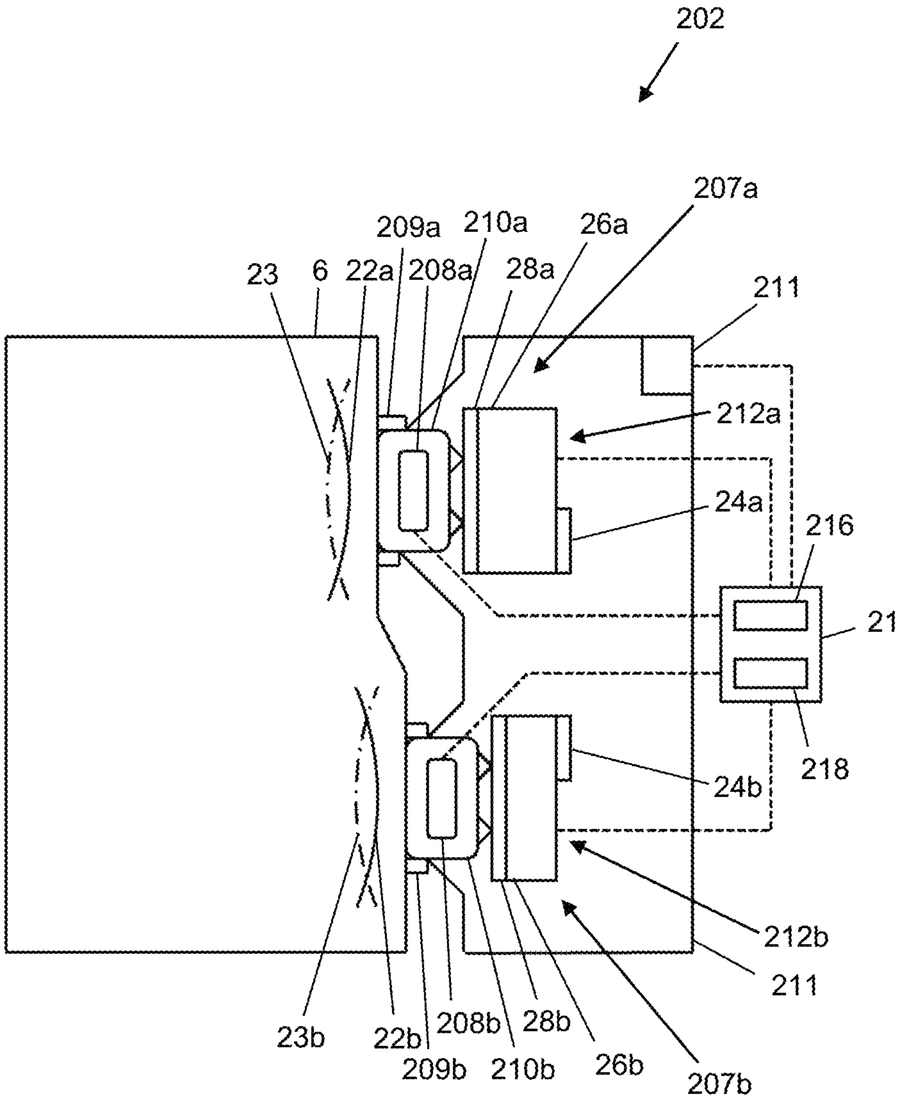
FIG. 12 is a close-up cross-sectional schematic view of the second alternative wearable device in a third configuration.

FIG. 12 is a close-up cross-sectional schematic view of the second alternative wearable device 202 in the third configuration following the second and third steps S2, S3.

Figure 13:
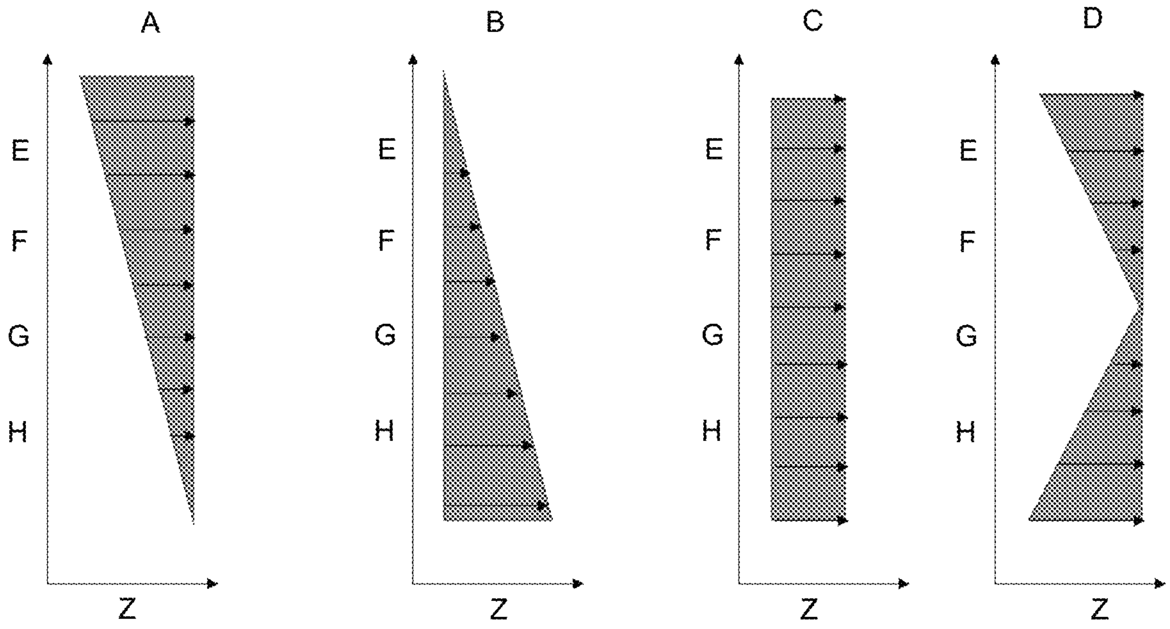
FIG. 13 shows a series of graphs showing the relationship between vest segment compression force or displacement and body shape.

FIG. 13 is a series of graphs showing the relationship between actuation displacement or force on the x-axis (denoted by reference numeral Z) and torso 6 location on the y-axis. FIG. 13 demonstrates a method of using a third alternative wearable device. In the third alternative wearable device, the first and second actuators are not actuated based on first and second values that have been determined based on third and fourth signals produced by the first and second sensors. Instead, the first and second values are determined based on one or more predetermined characteristics of the body of the patient.

By way of a first example of such a third alternative wearable device, an input means may be provided that can be used to input characteristics of the body such as the shape (e.g. morphotype), BMI and/or sex of the torso 6. The values for each of the actuators (i.e. the first and second values, etc.) can be determined based on the inputted characteristics, and the actuators can be actuated based on the values. In FIG. 13, the actuator displacement or force for a high BMI (i.e. pyramid) body type across a range of torso 6 locations is shown in graph A, the actuator displacement or force for an inverted pyramid body shape across a range of torso 6 locations is shown in graph B, the actuator displacement or force for a rectangular body shape across a range of torso 6 locations is shown in graph C and the actuator displacement or force for a female body shape across a range of torso 6 locations is shown in graph D.

If the patient has a high BMI (e.g. a BMI greater than or equal to 30), this implies the patient is likely to be wider in the middle torso area than in the upper torso area. Accordingly, the level of actuation of actuators closer to the neck region may be greater than those just above the diaphragm and the level of actuation of the actuators may increase in an upward direction and their values may be set accordingly. If the patient has an inverted pyramidal body shape, the level of actuation of the actuators may increase in a downward direction. If the patient has a flatter, rectangular body shape, the level of actuation of the actuators may be uniform. If the patient has a female body shape, the actuators in the upper and middle chest region may be preferentially actuated by different amounts. For instance, the level of actuation of actuators closer to the patient's clavicle and just above the patient's diaphragm may be greater than the level of actuation of actuators disposed between the patient's clavicle and diaphragm. The level of actuation of the actuators may alternatively be decreased during such a process.

By way of a second example of such an alternative process, scanned geometry of the torso 6 may be obtained using a camera or a 3D laser scanner. The scanned geometry of the torso 6 may be obtained when the patient visits a respiratory therapist or pulmonologist visit in which a HFCWO vest is initially fitted to the patient. The values for each of the actuators (e.g. the first and second values, etc.) can be determined based on the scanned geometry of the torso 6, and the actuators can be actuated based on the values.

The scanned geometry or patient specific data such as BMI, sex and body shape may also be used to set the base pressure of the inflatable body 4. For example, the base pressure for patients with higher BMIs (e.g. greater than or equal to 30) may be set lower than the base pressure for patients with lower BMIs (e.g. below 20). The base pressure can be set using the following scaling law, in which $P_B$ is the optimised base pressure and $P_0$ is the standard base pressure:

$$P_B = fP_0,$$

$$\text{where } f \propto \frac{1}{BMI}$$

In some arrangements, the first point or points of contact when inflating the inflatable body 4 may be sensed, which can be used to estimate patient body shape and BMI (the first point or points of contact correlate highly with patient body shape and BMI). Subsequently, the actuators can be actuated in an order extending radially outward from the first point or points of contact. In some arrangements, an additional pressure can be created at the back of the sensor using additional actuators to bend it into a convex shape that improves the likelihood of the contact being closer to the centre of the sensor.

In some arrangements, optimized vest inflation settings (e.g. amounts of inflation or actuation) for a particular patient may be stored in memory (e.g. memory 18). The inflation of the inflatable body 4 and the actuation of the actuators may then be set to the optimized vest inflation settings during a subsequent therapy session for the same patient. The optimal settings will likely not change significantly over time as patient body weight and BMI is almost constant, especially over a period of days or weeks. The start-up time of the vest when it is in the mucus build-up quantification mode can therefore be reduced. Optimal vest inflation settings for multiple, different patients (with fairly similar BMI and body shape) can be stored in memory, in order to permit the HFCWO to be shared by multiple users. This could be useful in households with multiple CF or COPD patients or in an out-patient therapy setting.

Although it has been described that the first and second sensors 8*a*, 8*b* emit first and second sound pulses and the third and fourth signals are produced by the first and second sensors 8*a*, 8*b* based on reflections of the first and second sound pulses, this need not be the case. In alternative arrangements, the first and second sensors 8*a*, 8*b* do not emit first and second sound pulses and the third and fourth signals are instead identified as being produced based on a sound emitted by a heartbeat of the heart 3. In such arrangements, the first and second sensors 8*a*, 8*b* may be tuned to filter out low frequencies (e.g. such as those produced by heartbeats) only after initial setup of the wearable device 2. Since the first and second sensors 8*a*, 8*b* are placed between the torso 6 and the wearable device 2, they not only pick up sounds produced by the torso 6, but also pick up sounds generated by the wearable device 2 and its inflatable body pump 11. The signal level of the sounds generated by the inflatable body pump 11 is dependent on the on the mechanical contact between the torso 6, the first and second sensors 8*a*, 8*b* and the wearable device 2. Accordingly, in addition or alternatively, the third and fourth signals can be identified as being produced based on sounds emitted by the wearable device 2 such as sounds emitted by the inflatable body pump 11.

Although it has been described that the first value is an SNR of the third signal and the second value is an SNR of the fourth signal, this need not be the case. In particular, in alternative arrangements, the first value may be a proxy for SNR of the third signal (e.g. the amplitude of the third signal) and the second value may be an SNR of the fourth signal (e.g. the amplitude of the fourth signal). Several audio signal processing techniques maybe employed to determine the SNR or SNR proxy. For example, the power spectral density (PSD) can be compared between intervals in which the user 1 breathes normally and holds their breath. This allows the differentiation of the actual acoustic signals from the noise floor, and determines the noise and signal power at a given inflation pressure. Alternatively, a matched filter can be applied, which maximizes SNR in the presence of additive stochastic noise (such as that produced when the first and second sensors 8*a*, 8*b* emit first and second sound pulses). In this case a template matching approach is used to determine the SNR by comparing the reflected and emitted signal characteristics. Although it has been described that the first and second sensors 8*a*, 8*b* are microphones, they may alternatively be contact sensors such as piezo displacement sensors or accelerometers.

In some arrangements, the wearable device 2 may comprise a plurality of clamping mechanisms. The clamping mechanism may anchor the sensing devices to clothing of the user 1 in order to minimise sensor shift. The sensor shift along the chest may also be measured during or prior to sound acquisition so that the inflation pressure can be adjusted either manually by the patient, or, in alternative arrangements, automatically, to keep the shift below a pre-defined threshold.

Each of the above steps may occur automatically, without the input of the user 1. However, in alternative arrangements, the method of using the wearable device 2 may involve steps that are carried out manually by the user 1. For example, the first and second actuators may be bands or straps and actuating the first and second actuators from the first states to the second states may involve manual actions such as the user 1 tightening the band or straps. After the first step S1 and prior to tightening, the user 1 may be given information relating to the quality of the acoustic signals, and, thus, the size of the air gaps at the sensor locations. The user 1 is then given instructions to tighten the bands or straps near sensors where an air gap has been detected. This can be done by giving the patient an audio-visual report of the locations to be tightened (e.g. on a phone screen, via light indicators on the sensors or a sound indication). Feedback can be provided during the tightening manoeuvre to indicate proper placement, for example via sound signals (e.g. sound tones that increase in frequency based on how close to the optimum tightness the bands or straps have been tightened) or light indicators that change colour.

The contact with torso 6 may be mediated by an air chamber. The air chamber may be enclosed by a diaphragm. In such arrangements, good contact with the torso 6 avoids impedance mismatch or a loss of sensitivity due to a leaking air seal. Microphones having air chambers enclosed by diaphragms have a relatively poor response in the highest relevant frequency range (e.g. 2 to 4 kHz). Accordingly, the inflating pressure may be regulated so as to regulate the tuning of the diaphragm and tune the frequency response of the sensor to a particular frequency range outside this range. In such arrangements, the pressure may be regulated dynamically, for example by changing the pressure range during examination of the torso 6 by altering the inflating pressure after contact with torso 6 has been established.

The first step S1 of the method 500 should precede the second, third and fourth steps S2, S3, S4. Further, the fourth step S4 should follow the second and third steps S3, S4. However, the second step S2 can follow or be carried out at the same time as the third step S3.

As indicated above, the structure and operation of wearable device and the steps of the associated method 500 in the preceding description have been described with reference to only a first sensing device and a second sensing device. However, as indicated above, the wearable device may comprise more than two sensing devices and the remaining sensing devices may have the same structure, interface with the remaining components of the wearable device in the same manner and operate in the same manner as the first and second sensing devices.

The structure and operation of the wearable devices and the steps of the associated method 500 in the preceding description have been described with reference to arrangements comprising multiple sensing devices. However, the wearable device may alternatively comprise a single sensing device, which may have the same structure, interface with the remaining components of the wearable device in the same manner and operate in the same manner as the sensing devices described above.

Figure 14:
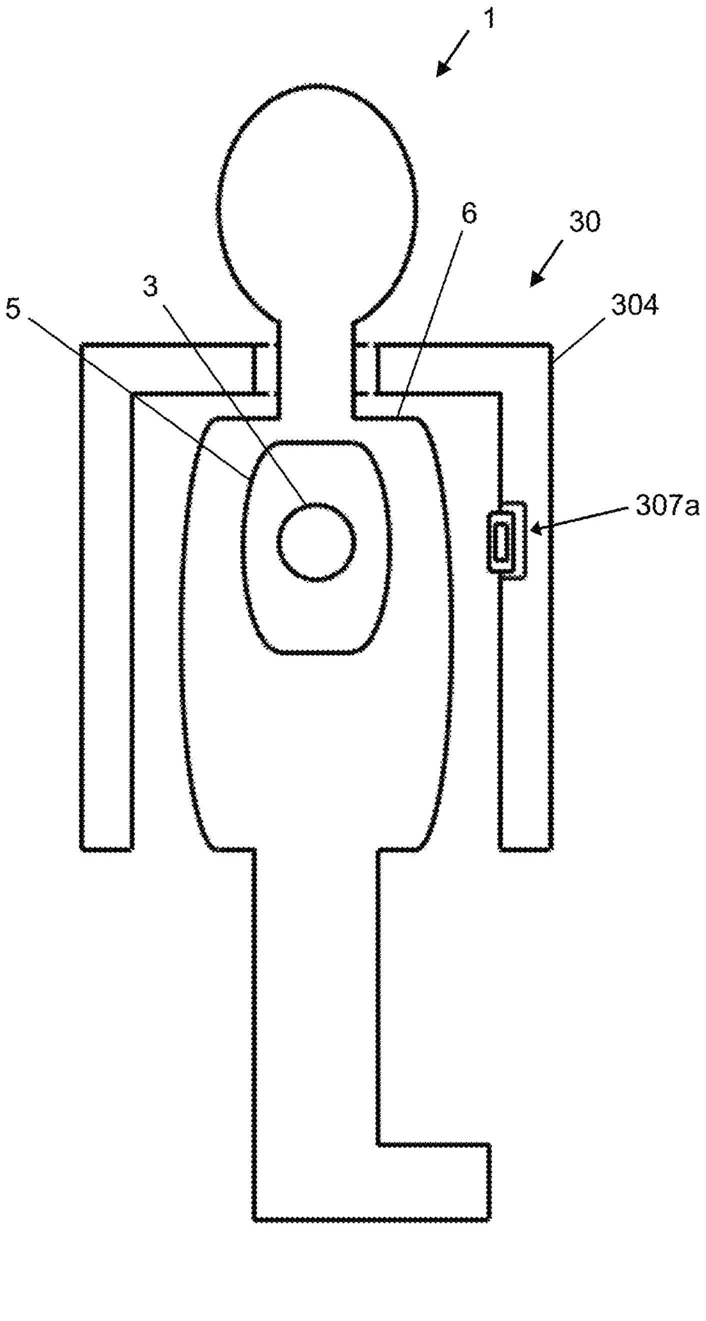
FIG. 14 is a schematic cross-sectional view of a fourth alternative wearable device mounted on a torso of a user.

FIG. 14 is a schematic cross-sectional view of a fourth alternative wearable device 302 comprising a single sensing device 307 and a user 1. The structure and operation of the fourth alternative wearable device 302 generally corresponds to the structure and operation of the wearable device 2. Corresponding features are denoted using equivalent reference numbers, with the addition of a value of 300. The wearable device 2 is shown in a first configuration in FIG. 14.

Figure 15:
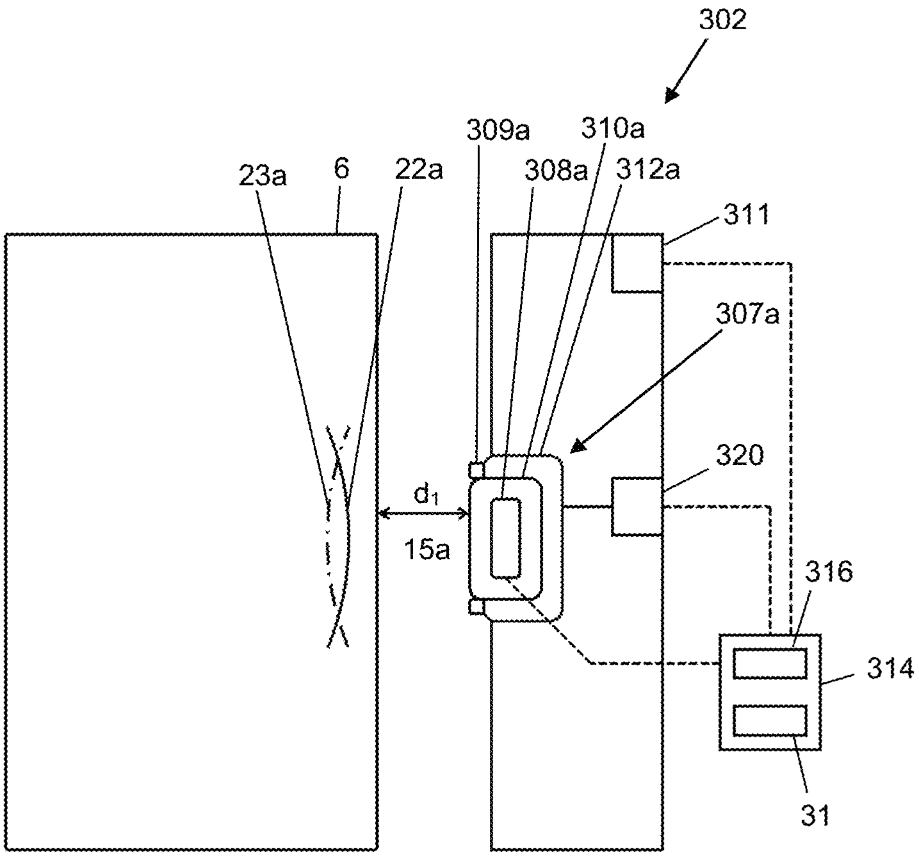
FIG. 15 is a close-up cross-sectional schematic view of the fourth alternative wearable device in a first configuration.

FIG. 15 is a close-up cross-sectional schematic view of the fourth alternative wearable device 302 in the first configuration.

Figure 16:
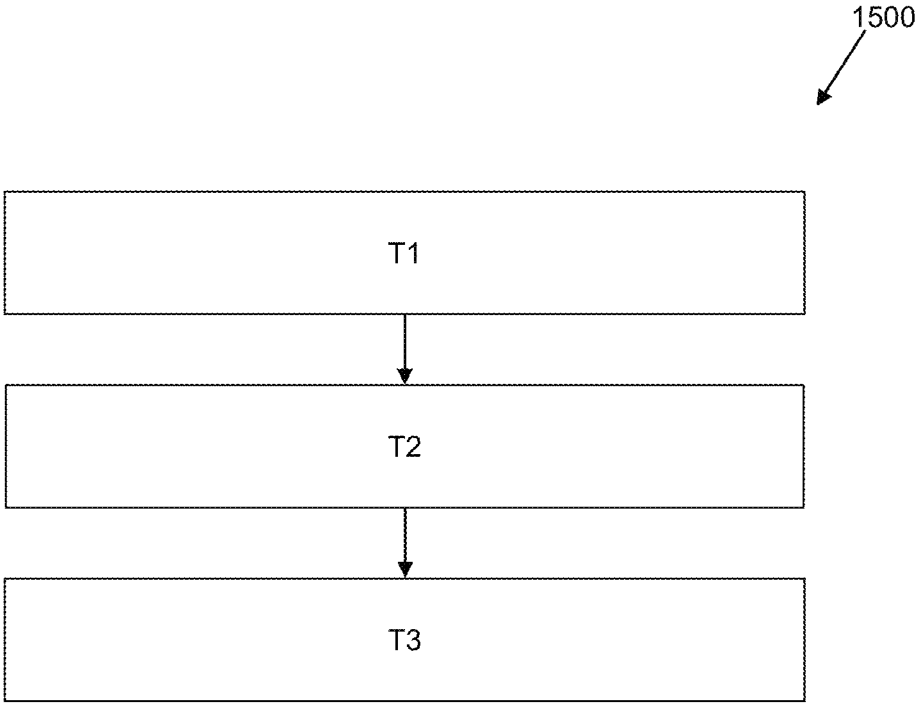
FIG. 16 shows a flow chart of a method of using the fourth alternative wearable device.

FIG. 16 shows a flow chart of a method 1500 carried out by the fourth alternative wearable device 302. The method 1500 comprises a first step T1, a second step T2 and a third step T3. The first, second and third steps T1, T2, T3 of the method 1500 correspond to the first, second and fourth steps S1, S2, S4 of the method 500 described above, respectively.

Figure 17:
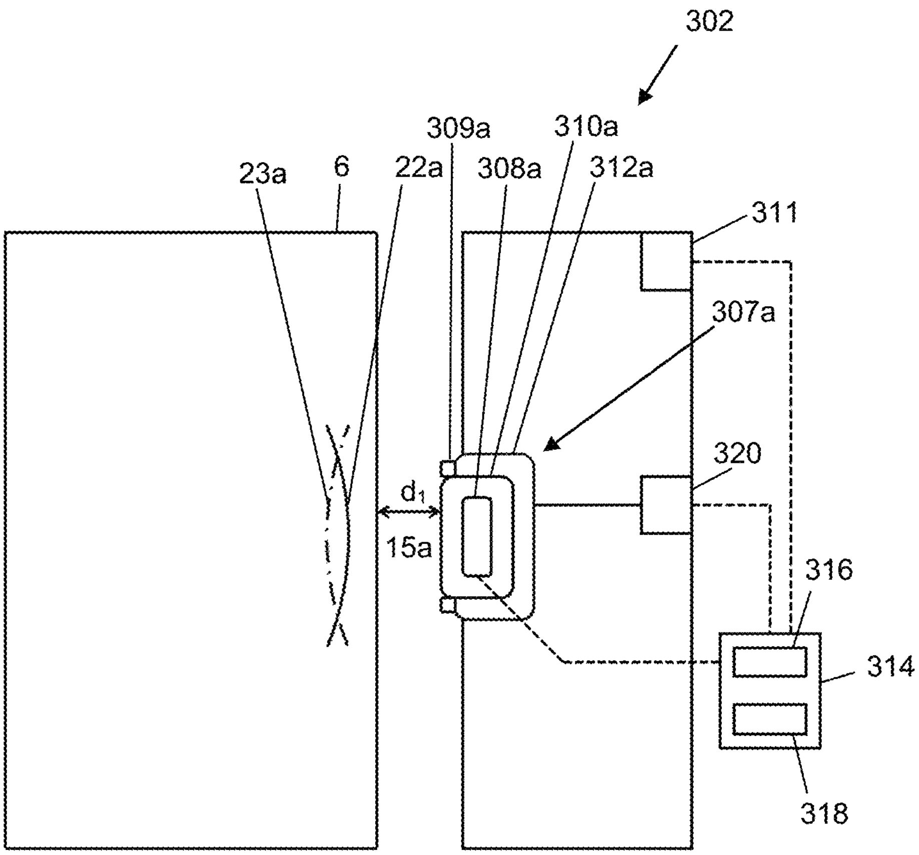
FIG. 17 is a close-up cross-sectional schematic view of the fourth alternative wearable device in a second configuration.

FIG. 17 is a close-up cross-sectional schematic view of the fourth alternative wearable device 302 in the second configuration following the first step T1.

Figure 18:
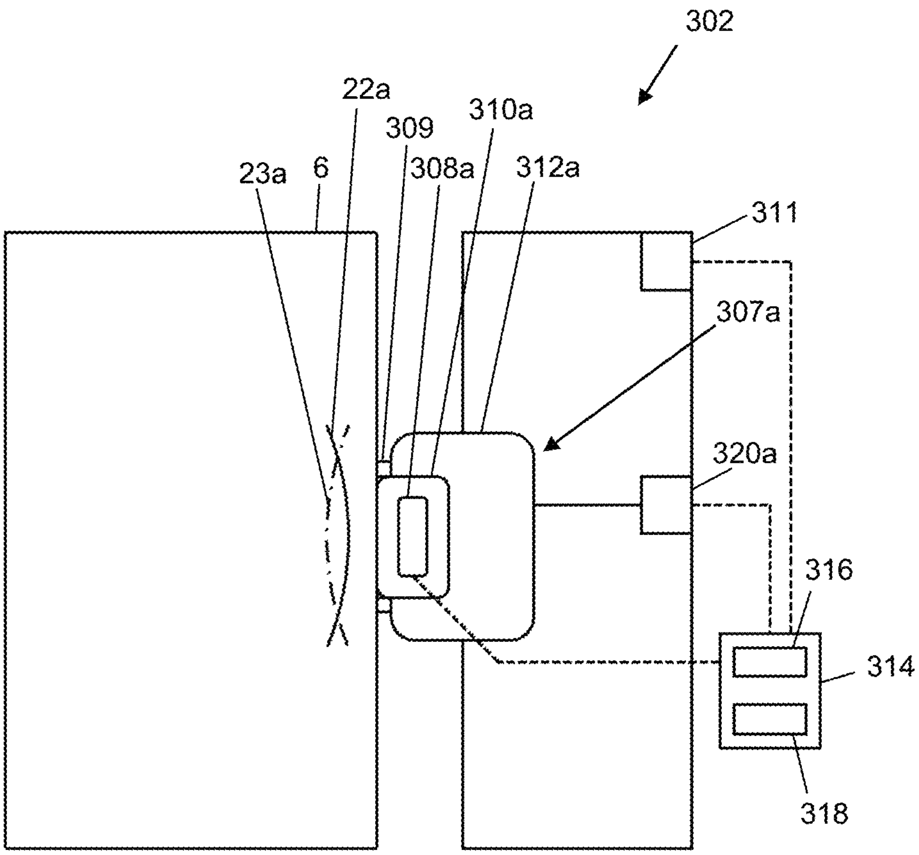
FIG. 18 is a close-up cross-sectional schematic view of the fourth alternative wearable device in a third configuration.

FIG. 18 is a close-up cross-sectional schematic view of the fourth alternative wearable device 302 in the third configuration following the second step T2.

Although the fourth alternative wearable device 302 is shown as comprising a single sensing device corresponding to that described with reference to FIGS. 1 to 6, the single sensing device may instead correspond to that described with reference to any of the remaining Figures.

For clarity, many feature have been described with reference to a single arrangement. However, the strategies described above may be combined in a single embodiment.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A wearable device, the wearable device comprising:

an inflatable body configured to be mounted to a torso of a user;

an air pump configured to inflate the inflatable body and to drive chest wall oscillation therapy while the inflatable body is mounted to the user's torso;

a first sensing device, wherein the first sensing device comprises a first sensor and a first actuator coupling the first sensor to the inflatable body; and a memory storing computer-readable instructions that, when executed, cause the wearable device to:

inflate the inflatable body from a first state of the inflatable body to a second state of the inflatable body;

after the inflatable body has been inflated to the second state, actuate the first actuator from a first state of the first actuator to a second state of the first actuator, wherein actuating the first actuator from the first state of the first actuator to the second state of the first actuator reduces a volume of a first air gap between the torso and the first sensor; and while the inflatable body is in the second state of the inflatable body and the first actuator is in the second state of the first actuator, receive a first signal from the first sensor.

2. The wearable device of claim 1, further comprising a second sensing device, wherein the second sensing device comprises a second sensor and a second actuator coupling the second sensor to the inflatable body, wherein the computer-readable instructions, when executed, further cause the wearable device to actuate the second actuator from a first state of the second actuator to a second state of the second actuator and receive a second signal from the second sensor, wherein actuating the second actuator from the first state of the second actuator to the second state of the second actuator reduces a volume of a second air gap between the torso and the second sensor, wherein the second signal is received from the second sensor while the inflatable body is in the second state of the inflatable body and the second actuator is in the second state of the second actuator.

3. The wearable device of claim 1, wherein the first sensing device comprises a first housing that houses the first sensor and the first air gap is between the torso and the first housing, wherein the first actuator couples the first housing to the inflatable body and actuating the first actuator from the first state of the first actuator to the second state of the first actuator reduces the volume of the first air gap between the torso and the first housing, and wherein the second sensing device comprises a second housing that houses the second sensor and the second air gap is between the torso and the second housing, wherein the second actuator couples the second housing to the inflatable body and actuating the second actuator from the first state of the second actuator to the second state of the second actuator reduces the volume of the second air gap between the torso and the second housing.

4. The wearable device of claim 1, wherein the first sensor is a first acoustic sensor and wherein the second sensor is a second acoustic sensor.

5. The wearable device of claim 1, wherein the first actuator comprises a first inflatable bladder, wherein actuating the first actuator from the first state of the first actuator to the second state of the first actuator comprises inflating the first inflatable bladder, wherein the second actuator comprises a second inflatable bladder and wherein actuating the second actuator from the first state of the second actuator to the second state of the second actuator comprises inflating the second inflatable bladder.

6. A method comprising:

inflating the inflatable body of the wearable device of claim 1 from the first state of the inflatable body to the second state of the inflatable body;

after the inflatable body has been inflated to a second state, actuating the first actuator from the first state of the first actuator to the second state of the first actuator, wherein actuating the first actuator from the first state of the first actuator to the second state of the first actuator reduces the volume of the first air gap; and while the inflatable body is in the second state of the inflatable body and the first actuator is in the second state of the first actuator, receiving a first signal from the first sensor.

7. The method of claim 6, further comprising actuating a second actuator from a first state of the second actuator to a second state of the second actuator and receiving a second signal from a second sensor, wherein actuating the second actuator from the first state of the second actuator to the second state of the second actuator reduces a volume of a second air gap between the torso and the second sensor, wherein the second signal is received from the second sensor while the inflatable body is in the second state of the inflatable body and the second actuator is in the second state of the second actuator.

8. The method of claim 6, further comprising maintaining the first actuator in the second state of the first actuator for a first period of time and receiving the first signal from the first sensor while the first actuator is maintained in the second state of the first actuator, wherein the method further comprises maintaining the second actuator in the second state of the second actuator for a second period of time and receiving the second signal from the second sensor while the second actuator is maintained in the second state of the second actuator.

9. The method of claim 7, further comprising:

while the inflatable body is in the second state of the inflatable body, receiving a third signal from the first sensor;

determining a first value related to the volume of the first air gap based on the third signal;

actuating the first actuator from the first state of the first actuator to the second state of the first actuator based on the first value, wherein the method further comprises receiving a fourth signal from the second sensor while the inflatable body is in the second state of the inflatable body, determining a second value related to the volume of the second air gap based on the fourth signal and actuating the second actuator from the first state of the second actuator to the second state of the second actuator based on the second value.

10. The method of claim 9, wherein the first value is a signal-to-noise ratio or a signal-to-noise ratio proxy of the third signal and wherein the second value is a signal-to-noise ratio or a signal-to-noise ratio proxy of the fourth signal.

11. The method of claim 10, further comprising the first sensor emitting a first sound pulse and producing the third signal based on a reflection of the first sound pulse and wherein the method further comprises the second sensor emitting a second sound pulse and producing the fourth signal based on a reflection of the second sound pulse.

12. The method of claim 9, wherein the torso comprises a heart and wherein the third signal is identified as being produced based on a sound emitted by a heartbeat of the heart and wherein the fourth signal is identified as being produced based on a sound emitted by a heartbeat of the heart.

13. The method of claim 9, wherein the torso comprises a lung, wherein the method further comprises determining a period of time in which the lung is not breathing, wherein the first value is determined based on the third signal produced during the period of time in which the lung is not breathing and wherein the second value is determined based on the fourth signal produced during the period of time in which the lung is not breathing.

14. The method of claim 6, further comprising:

actuating the first actuator from the first state of the first actuator to the second state of the first actuator based on a first value, wherein the first value is determined based on one or more predetermined characteristics of the torso, wherein the method further comprises actuating the second actuator from the first state of the second actuator to the second state of the second actuator based on a second value, wherein the second value is determined based on one or more predetermined characteristics of the torso.

* * * * *